United States Patent
Ithal et al.

(10) Patent No.: US 12,052,278 B1
(45) Date of Patent: Jul. 30, 2024

(54) CLOUD DATA PEAK SIGNAL DETECTION AND PRIORITIZATION FOR DATA SECURITY POSTURE MANAGEMENT

(71) Applicant: Normalyze, Inc., Los Altos, CA (US)

(72) Inventors: Ravishankar Ganesh Ithal, Los Altos, CA (US); Yang Zhang, Fremont, CA (US); Mummoorthy Murugesan, Gilroy, CA (US); Gautam Kanaparthi, Los Altos, CA (US)

(73) Assignee: Normalyze, Inc., Los Altos, CA (US)

( * ) Notice: Subject to any disclaimer, the term of this patent is extended or adjusted under 35 U.S.C. 154(b) by 0 days.

(21) Appl. No.: 18/243,056

(22) Filed: Sep. 6, 2023

Related U.S. Application Data

(60) Provisional application No. 63/523,312, filed on Jun. 26, 2023.

(51) Int. Cl.
*H04L 9/40* (2022.01)
*G06F 21/57* (2013.01)
*H04L 29/06* (2006.01)

(52) U.S. Cl.
CPC ........ *H04L 63/1433* (2013.01); *G06F 21/577* (2013.01); *H04L 63/205* (2013.01)

(58) Field of Classification Search
CPC ... H04L 63/1433; H04L 63/20; H04L 63/205; H04L 63/14; G06F 21/577; G06F 21/57; G06F 21/50; G06F 21/60
See application file for complete search history.

(56) References Cited

U.S. PATENT DOCUMENTS

| | | | |
|---|---|---|---|
| 2014/0222496 A1* | 8/2014 | Flores | G06Q 10/0635 705/7.28 |
| 2016/0162693 A1* | 6/2016 | Breuer | G06F 3/0637 713/164 |

\* cited by examiner

*Primary Examiner* — Edward Zee
(74) *Attorney, Agent, or Firm* — Flagship Patents; Sikander M. Khan; Chris J. Volkmann

(57) ABSTRACT

The technology disclosed relates to analysis of data posture of a cloud environment. In particular, the disclosed technology relates to a system and method for analyzing cloud assets, such as storage resources, compute resources, etc. to detect peak signals based on occurrences of sensitive data types or other data classifications in the cloud assets. A system for prioritized presentation of high-value cloud resources susceptible to cloud security risks includes a processor, a display, and memory accessible by the processor and executable to, on a cloud resource-by-cloud resource basis, analyze data in a given cloud resource, and attribute a plurality of data sensitivity parameters to the data in the given cloud resource, and a peak value indicating an appraisal of the data in the given cloud resource. A graphical interface includes graphical objects configured to display the given cloud resource, the plurality of data sensitivity parameters, and the peak value.

22 Claims, 30 Drawing Sheets

| Overview | Data Stores 636 | | | | | | | Get summary report |
|---|---|---|---|---|---|---|---|---|
| ⌂ Home | | | | | | | | |
| ∿ Visualization | Unstructured | Structured | | | | | | |
| ⚠ Risks 638 | Datastores | Databases | Tables | Columns | | | | |
| Inventory | Search... 622 | ⇔ 624 | 626 | 628 | 630 | 632 | 635 | |
| ⊟ Data | Name ⇔ Type | ⇔ Volume ⇔ | Engine ⇔ | Likelihood ⇔ | Impact ⇔ | Entities 633 | Profiles | Risk Score ⇔ Owner ⇔ Average Size |
| ⊟ Assets 620 | ABC | RDS-INSTANCE | 20GB | MYSQL | HIGH | HIGH | DOMAIN_NAME (9) PHONE_NUMBER (3) EMAIL_ADDRESS (40) +3 | PERSON_N.. EMAIL (23) | 60 |
| ⊞ Packages | rds-mysql-log-scan | RDS-INSTANCE | 100GB | MYSQL | HIGH | HIGH | US_SSN (18) EMAIL_ADDRESS (24) DATE (20) | | 100 |
| ⊟ Identities 652 | status-postgresql-cluster-0 | RDS-INSTANCE | 1GB | AURORA-P... | HIGH | LOW | | | 0 |
| Data Scan | retool-postgresql-cluster | RDS-INSTANCE | 1GB | aurora-post... | LOW | LOW | | | 0 |
| ▦ Profiles | ec-mongodb-instance | EC2DB-INSTANCE | 1GB | mongo | LOW | LOW | | | 0 |
| ✻ Entities | | | | | | | | | |
| ⊟ Scan Settings | | | | | | | | | |
| Risk Investigation | | | | | | | | | |
| ⚐ Risk Signatures | | | | | | | | | |
| ⊞ Query Builder | | | | | | | | | |
| ⊡ Automations | | | | | | | | | |
| Settings ⓘ | | | | | | | | | |

CLOUD DATA PEAK SIGNAL DETECTION AND PRIORITIZATION FOR DATA SECURITY POSTURE MANAGEMENT

CROSS-REFERENCE TO RELATED APPLICATION

The present application is based on and claims the benefit of U.S. provisional patent application Ser. No. 63/523,312, filed Jun. 26, 2023, the contents of which are hereby incorporated by reference in their entirety.

FIELD OF THE TECHNOLOGY DISCLOSED

The technology disclosed generally relates to cloud environments. More specifically, but not by limitation, the present disclosure relates to improved systems and methods of cloud security posture management (CSPM), cloud infrastructure entitlement management (CIEM), cloud-native application protection platform (CNAPP), and/or cloud-native configuration management database (CMDB).

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Cloud computing provides on-demand availability of computer resources, such as data storage and compute resources, often without direct active management by users. Thus, a cloud environment can provide computation, software, data access, and storage services that do not require end-user knowledge of the physical location or configuration of the system that delivers the services. In various examples, remote servers can deliver the services over a wide area network, such as the Internet, using appropriate protocols, and those services can be accessed through a web browser or any other computing component.

Examples of cloud storage services include Amazon Web Services™ (AWS), Google Cloud Platform™ (GCP), and Microsoft Azure™, to name a few. Such cloud storage services provide on-demand network access to a shared pool of configurable resources. These resources can include networks, servers, storage, applications, services, etc. The end-users of such cloud services often include organizations that have a need to store sensitive and/or confidential data, such as personal information, financial information, medical information. Such information can be accessed by any of a number of users through permissions and access control data assigned or otherwise defined through administrator accounts.

The discussion above is merely provided for general background information and is not intended to be used as an aid in determining the scope of the claimed subject matter.

SUMMARY

The technology disclosed relates to analysis of data posture of a cloud environment. In particular, the disclosed technology relates to a system and method for analyzing cloud assets, such as storage resources, compute resources, etc. to detect peak signals based on occurrences of sensitive data types or other data classifications in the cloud assets.

An example system for prioritized presentation of high-value cloud resources susceptible to cloud security risks includes a processor, a display, and memory accessible by the processor and executable to, on a cloud resource-by-cloud resource basis, analyze data in a given cloud resource, and attribute a plurality of data sensitivity parameters to the data in the given cloud resource, and a peak value indicating an appraisal of the data in the given cloud resource. A graphical interface includes graphical objects configured to display the given cloud resource, the plurality of data sensitivity parameters, and the peak value. The graphical interface is configured to amplify and/or attenuate a display priority of the cloud resources in dependence upon corresponding peak values.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 12 illustrates an example user interface display that displays identified data stores.

FIG. 14 illustrates an example user interface display for selecting a connection type for connecting a data store.

FIGS. 15-1 and 15-2 (collectively referred to as FIG. 15) provide a flow diagram illustrating one example of performing content-based classification of data items.

FIGS. 19-1, 19-2, and 19-3 (collectively referred to as FIG. 19) provide a flow diagram illustrating an example operation of detecting peak signal values for cloud assets.

FIGS. 23-1 and 23-2 (collectively referred to as FIG. 23) illustrate an example operation for prioritized presentation of cloud resources susceptible to cloud security risks.

DETAILED DESCRIPTION

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

As noted above, cloud computing environments are used by organizations or other end-users to store a wide variety of different types of information in many contexts and for many uses. This data can often include sensitive and/or confidential information, and can be the target for malicious activity such as acts of fraud, privacy breaches, data theft, etc. These risks can arise from individuals that are both inside the organization as well as outside the organization.

Cloud environments often include security infrastructure to enforce access control, data loss prevention, or other processes to secure data from potential vulnerabilities. However, even with such security infrastructures, it can be difficult for an organization to understand the data posture and breadth of access to the data stored in the cloud in the organization's cloud account. In other words, it can be difficult to identify which users have access to which data, and which data may be exposed to malicious or otherwise unauthorized users, both inside or outside the organization.

The present system is directed to a cloud security posture analysis system configured to analyze and take action on the security posture of a cloud account. The system detects peak signals that are an expression of a value and risk associated with a digital asset, such as compute resources, storage resources, or other cloud resources based on classifying data in those assets. The peak signal represents a prioritization and/or risk assessment/quantification that quantifies potential impact of data breach or loss. The peak signal can be utilized to prioritize resources and make decisions regarding risk mitigations in the cloud resources, such as by implementing data protection policies. Further, in at least some described examples, data scanners execute in the cloud service, itself, with metadata being returned indicative of the analysis. Thus, in organizations cloud data does not leave the organization's cloud account. Rather, the data can be scanned in place and metadata sent for analysis by the cloud security posture analysis system, which further enhances data security.

Figure 1:
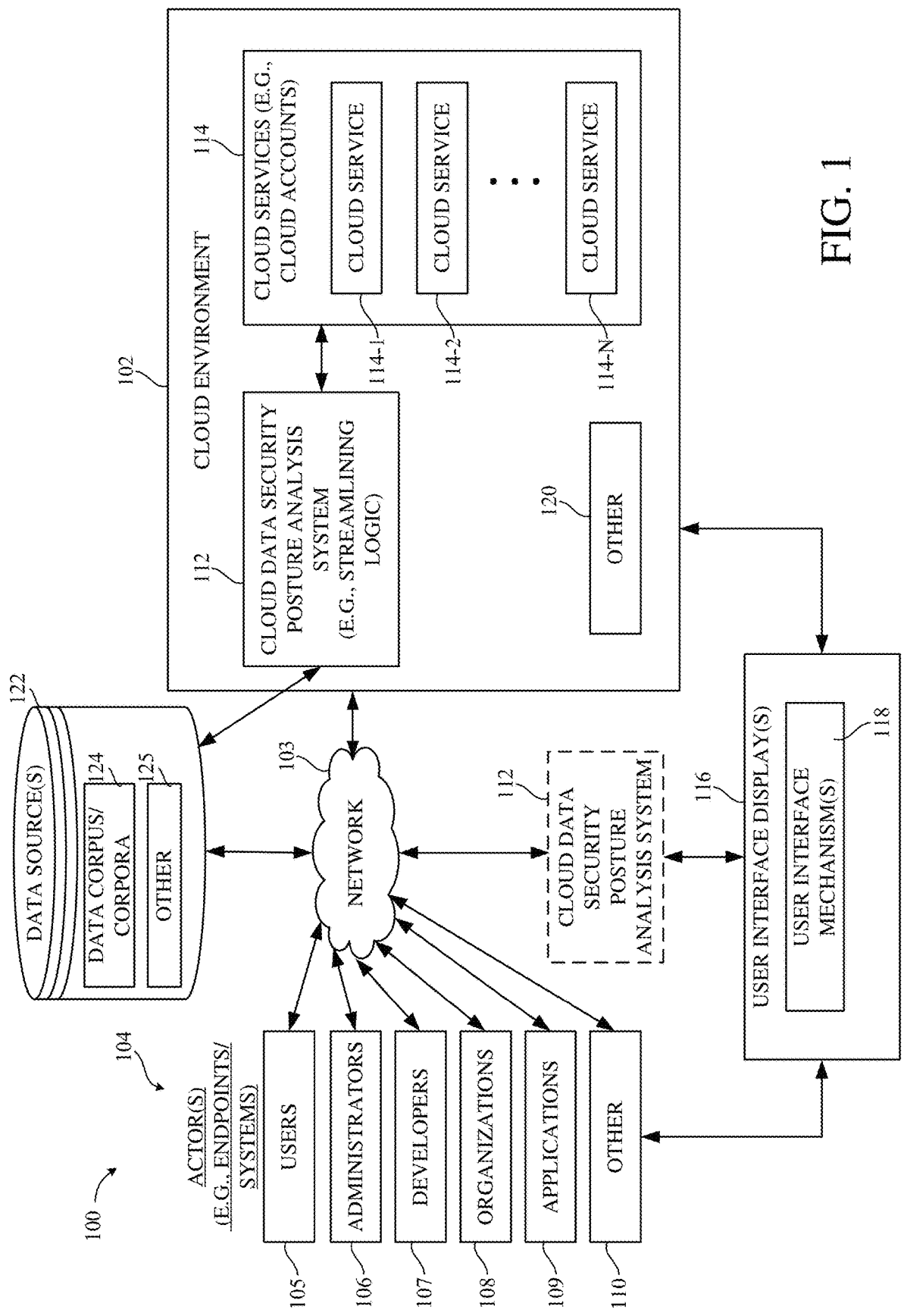
FIG. 1 is a block diagram illustrating one example of a cloud architecture.

FIG. 1 is a block diagram illustrating one example of a cloud architecture 100 in which a cloud environment 102 is accessed by one or more actors 104 through a network 103, such as the Internet or other wide area network. Cloud environment 102 includes one or more cloud services 114-1, 114-2, 114-N, collectively referred to as cloud services 114. As noted above, cloud services 114 can include cloud storage services such as, but not limited to, AWS, GCP, Microsoft Azure, to name a few.

Further, cloud services 114-1, 114-2, 114-N can include the same type of cloud service, or can be different types of cloud services, and can be accessed by any of a number of different actors 104. For example, as illustrated in FIG. 1, actors 104 include users 105, administrators 106, developers 107, organizations 108, and/or applications 109. Of course, other actors 110 can access cloud environment 102 as well.

Cloud architecture 100 includes a cloud data security posture analysis system 112 configured to access cloud services 114 to identify and analyze cloud security posture data. Examples of system 112 are discussed in further detail below. Briefly, however, system 112 is configured to access cloud services 114 and identify connected resources, entities, actors, etc. within those cloud services, and to identify risks and violations against access to sensitive information. As shown in FIG. 1, system 112 can reside within cloud environment 102 or outside cloud environment 102, as represented by the dashed box in FIG. 1. Of course, system 112 can be distributed across multiple items inside and/or outside cloud environment 102.

Users 105, administrators 106, developers 107, or any other actors 104, can interact with cloud environment 102 through user interface displays 116 having user interface mechanisms 118. For example, a user can interact with user interface displays 116 provided on a user device (such as a mobile device, a laptop computer, a desktop computer, etc.) either directly or over network 103. Cloud environment 102 can include other items 120 as well.

Cloud data security posture analysis system 112 is configured to access one or more data sources 122 over network 103 to detect peak signals for cloud assets in cloud environment 102. Examples are discussed in further detail below. Briefly, however, external data source(s) 122 can include a data corpus or corpora 124, and can include other data sources 125. An example data corpus includes text data, speech data, or other data, that include or represent historical peak signal attributes that are analyzed to detect peak signals for the cloud assets in cloud environment 102. The data sources can include publicly accessible data sources over the Internet. Some examples include new articles, blogs, published literature, to name a few. These, of course, are for sake of example only.

Figure 2:
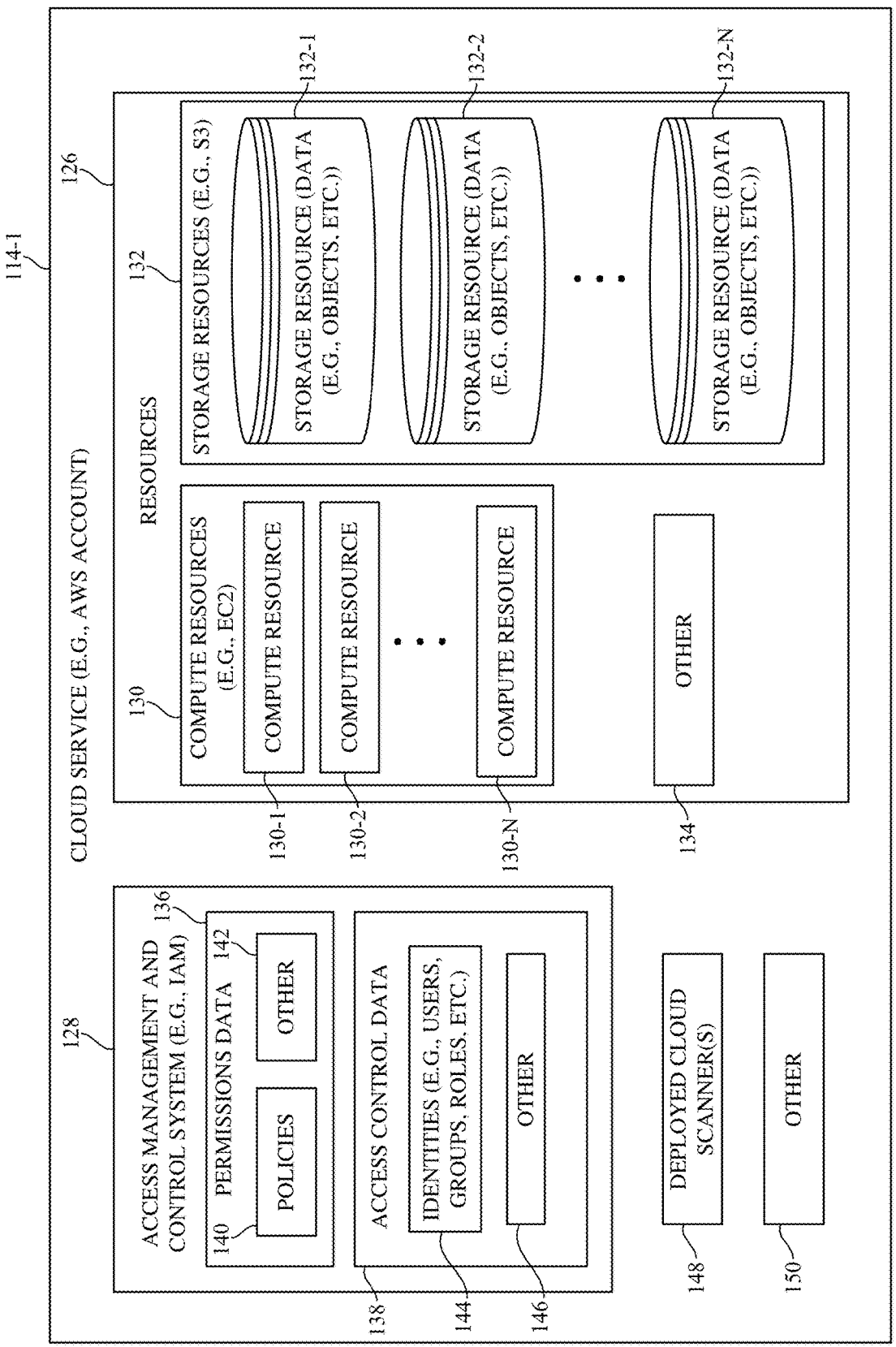
FIG. 2 is a block diagram illustrating one example of a cloud service.

FIG. 2 is a block diagram illustrating one example of cloud service 114-1. For the sake of the present discussion, but not by limitation, cloud service 114-1 will be discussed in the context of an account within AWS. Of course, other types of cloud services and providers are within the scope of the present disclosure.

Cloud service 114-1 includes a plurality of resources 126 and an access management and control system 128 configured to manage and control access to resources 126 by actors 104. Resources 126 include compute resources 130, storage resources 132, and can include other resources 134. Compute resources 130 include a plurality of individual compute resources 130-1, 130-2, 130-N, which can be the same and/or different types of compute resources. In the present example, compute resources 130 can include elastic compute resources, such as elastic compute cloud (AWS EC2) resources, AWS Lambda, etc.

An elastic compute cloud (EC2) is a cloud computing service designed to provide virtual machines called instances, where users can select an instance with a desired amount of computing resources, such as the number and type of CPUs, memory and local storage. An EC2 resource allows users to create and run compute instances on AWS, and can use familiar operating systems like Linux, Windows, etc. Users can select an instance type based on the memory and computing requirements needed for the application or software to be run on the instance.

AWS Lambda is an event-based service that delivers short-term compute capabilities and is designed to run code without the need to deploy, use or manage virtual machine instances. An example implementation is used by an organization to address specific triggers or events, such as database updates, storage changes or custom events generated from other applications. Such a compute resource can include a server-less, event-driven compute service that allows a user to run code for many different types of applications or backend services without provisioning or managing servers.

Storage resources 132 are accessible through compute resources 130, and can include a plurality of storage resources 132-1, 132-2, 132-N, which can be the same and/or different types of storage resources. A storage resource 132 can be defined based on object storage. For example, AWS Simple Storage Service (S3) provides highly-scalable cloud object storage with a simple web service interface. An S3 object can contain both data and metadata, and objects can reside in containers called buckets. Each bucket can be identified by a unique user-specified key or file name. A bucket can be a simple flat folder without a file system hierarchy. A bucket can be viewed as a container (e.g., folder) for objects (e.g., files) stored in the S3 storage resource.

Compute resources 130 can access or otherwise interact with storage resources 132 through network communication paths based on permissions data 136 and/or access control data 138. System 128 illustratively includes identity and access management (IAM) functionality that controls access to cloud service 114-1 using entities (e.g., IAM entities) provided by the cloud computing platform.

Permissions data 136 includes policies 140 and can include other permissions data 142. Access control data 138 includes identities 144 and can include other access control data 146 as well. Examples of identities 144 include, but are not limited to, users, groups, roles, etc. In AWS, for example, an IAM user is an entity that is created in the AWS service and represents a person or service who uses the IAM user to interact with the cloud service. An IAM user provides the ability to sign into the AWS management console for interactive tasks and to make programmatic requests to AWS services using the API, and includes a name, password, and access keys to be used with the API. Permissions can be granted to the IAM user to make the IAM user a member of a user group with attached permission policies. An IAM user group is a collection of IAM users with specified permissions. Use of IAM groups can make management of permissions easier for those users. An IAM role in AWS is an IAM identity that has specific permissions, and has some similarities to an IAM user in that the IAM role is an AWS identity with permission policies that determine what the identity can and cannot do in AWS. However, instead of being uniquely associated with one person, a role is intended to be assumable by anyone who needs it. Roles can be used to delegate access to users, applications, and/or services that don't normally have access to the AWS resources. Roles can be used by IAM users in a same AWS account and/or in different AWS accounts than the role. Also, roles can be used by computer resources 130, such as EC2 resources. A service role is a role assumed by a service to perform actions in an account on behalf of a user. Service roles include permissions required for the service to access the resources needed by the service. Service roles can vary from service to service. A service role for an EC2 instance, for example, is a special type of service role that an application running on an EC2 instance can assume to perform actions.

Policies 140 can include identity-based policies that are attached to IAM identities can grant permissions to the identity. Policies 140 can also include resource-based policies that are attached to resources 126. Examples include S3 bucket policies and IAM role trust policies. An example trust policy includes a JSON policy document that defines the principles that are trusted to assume a role. In AWS, a policy is an object that, when associated with an identity or resource, defines permissions of the identity or resource. AWS evaluates these policies when an IAM principal user or a role) makes a request. Permissions in the policy determine whether the request is allowed or denied. Policies are often stored as JSON documents that are attached to the IAM identities (user, groups of users, role).

A permissions boundary is a managed policy for an IAM identity that defines the maximum permissions that the identity-based policies can grant to an entity, but does not grant the permissions. Further, access control lists (ACLs) control which principles in other accounts can access the resource to which the ACL is attached. ACLs can be similar to resource-based policies. In some implementations of the technology disclosed, the terms "roles" and "policies" are used interchangeably.

Cloud service 114-1 includes one or more deployed cloud scanners 148, and can include other items 150 as well. Cloud scanner 148 run locally on the cloud-based services and the server systems, and can utilize elastic compute resources, such as, but not limited to, AWS Lambda resources. Cloud scanner 148 is configured to access and scan the cloud service 114-1 on which the scanner is deployed. Examples are discussed in further detail below. Briefly, however, a scanner accesses the data stored in storage resources 132, permissions data 136, and access control data 138 to identify particular data patterns (such as, but not limited to, sensitive string patterns) and traverse or trace network communication paths between pairs of compute resources 130 and storage resources 132. The results of the scanner can be utilized to identify subject vulnerabilities, such as resources vulnerable to a breach attack, and to construct a cloud attack surface graph or other data structure that depicts propagation of a breach attack along the network communication paths.

Given a graph of connected resources, such as compute resources 130, storage resources 132, etc.), entities (e.g., accounts, roles, policies, etc.), and actors (e.g., users, administrators, etc.), risks and violations against access to sensitive information is identified. A directional graph can be built to capture nodes that represent the resources and labels that are assigned for search and retrieval purposes. For example, a label can mark the node as a database or S3 resource, actors as users, administrators, developers, etc. Relationships between the nodes are created using information available from the cloud infrastructure configuration. For example, using the configuration information, system 112 can determine that a resource belongs to a given account and create a relationship between the policy attached to a resource and/or identify the roles that can be taken up by a user.

Figure 3:
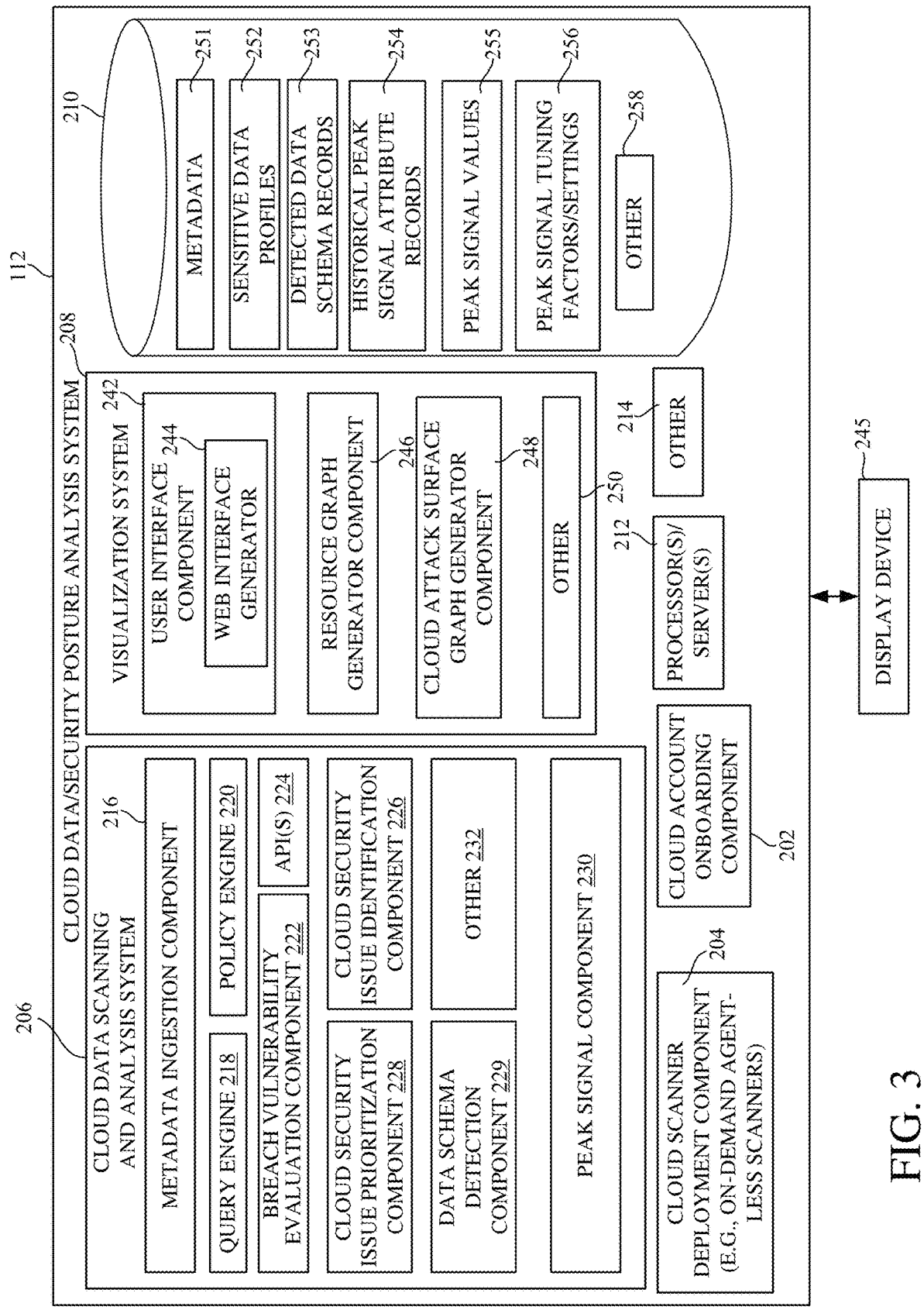
FIG. 3 is a block diagram illustrating one example of a cloud security posture analysis system.

FIG. 3 is a block diagram illustrating one example of cloud security posture analysis system 112. As noted above, system 112 can be deployed in cloud environment 102 and/or access cloud environment 102 through network 103 shown in FIG. 1.

System 112 includes a cloud account onboarding component 202, a cloud scanner deployment component 204, a cloud data scanning and analysis system 206, a visualization system 208, and a data store 210. System 112 can also include one or more processors or servers 212, and can include other items 214 as well.

Cloud account onboarding component 202 is configured to onboard cloud services 114 for analysis by system 112. After onboarding, cloud scanner deployment component 204 is configured to deploy a cloud scanner (e.g., deployed cloud scanner(s) 148 shown in FIG. 2) to the cloud service. In one example, the deployed scanners are on-demand agent-less scanners configured to perform agent-less scanning within the cloud service. One example of an agent-less scanner does not require agents to be installed on each specific device or machine. The scanners operate on the resources 126 and access management and control system 128 directly within the cloud service, and generate metadata that is returned to system 112. Thus, in one example, the actual cloud service data is not required to leave the cloud service for analysis.

Cloud data scanning and analysis system 206 includes a metadata ingestion component 216 configured to receive the metadata generated by the deployed cloud scanner(s) 148. System 206 also includes a query engine 218, a policy engine 220, a breach vulnerability evaluation component 222, one or more application programming interfaces (APIs) 224, a cloud security issue identification component 226, a cloud security issue prioritization component 228, a data schema detection component 229, a peak signal component 230, and can include other items 232 as well.

Query engine 218 is configured to execute queries against the received metadata and generated cloud security issue data. Policy engine 220 can execute security policies against the cloud data and breach vulnerability evaluation component 222 is configured to evaluate potential breach vulnerabilities in the cloud service. APIs 224 are exposed to users, such as administrators, to interact with system 112 to access the cloud security posture data.

Component 226 is configured to identify cloud security issues and component 228 can prioritize the identified cloud security issues based on any of a number of criteria. Peak signal component 230 is discussed below in further detail. Briefly, however, component 230 is configured to receive or otherwise obtain data scan results of cloud assets, such as resources 126, and to detect peak signal values that are assigned to the cloud assets. A peak signal value can be assigned to individual cloud assets, to a collection of cloud assets, or otherwise.

A peak signal includes an expression of a value and risk associated with a digital asset, such as, but not limited to, compute resources, storage resources, or other cloud resources, expressed or represented using a monetary function or value. The peak signal represents a prioritization and/or risk associated with the particular cloud asset.

Using the peak signals, system 112 can provide prioritized presentation of high-value cloud resources susceptible to cloud security risks. Visualization system 208 is configured to generate visualizations of the cloud security posture from system 206. Illustratively, system 208 includes a user interface component 242 configured to generate a user interface for a user, such as an administrator. In the illustrated example, component 242 includes a web interface generator 244 configured to generate web interfaces that can be displayed on a display device 245 in a web browser on a client device.

Visualization system 208 also includes a resource graph generator component 246, a cloud attack surface graph generator component 248, and can include other items 250 as well. Resource graph generator component 246 is configured to generate a graph or other representation of the relationships between resources 126. For example, component 246 can generate a cloud infrastructure map that graphically depicts pairs of compute resources and storage resources as nodes and network communication paths as edges between the nodes.

Cloud attack surface graph generator component 248 is configured to generate a surface graph or other representation of vulnerabilities of resources to a breach attack. In one example, the representation of vulnerabilities can include a cloud attack surface map that graphically depicts propagation of a breach attack along network communication paths as edges between nodes that represent the corresponding resources.

Data store 210 stores metadata 251 obtained by metadata ingestion component 216, sensitive data profiles 252, detected data schema records 253, historical peak signal attribute records 254, peak signal values 255, peak signal tuning factors or settings 256, and can include other items 258 as well. Examples of sensitive data profiles 252 are discussed in further detail below. Briefly, however, sensitive data profiles 252 can identify target data patterns that are to be categorized as sensitive or conforming to a predefined pattern of interest. Sensitive data profiles 252 can be used as training data for data classification performed by data schema detection component 229. Examples of data classification are discussed in further detail below. For instance, however, pattern matching can be performed based on the target data profiles. Illustratively, pattern matching can be performed to identify instances of data patterns corresponding to social security numbers, credit card numbers, other personal data, medical information, to name a few. In one example, artificial intelligence (AI) is utilized to perform named entity recognition (e.g., natural language processing modules can identify sensitive data, in various languages, representing names, company names, locations, etc.).

Detected data schema records 253 store detected instances of the target data profiles or entities that are returned based on content-based classification of the cloud data. An example detected data schema record 253 can store any of a variety of different data items representing the detected instance corresponding to the data record, including, but not limited to, a data store identifier, a database identifier, a table name identifier, a column name identifier, a column type identifier, a target data entity identifier, and/or a confidence score, among other data. A data store identifier identifies a particular data store that contains the detected instance of the target data profiles. A database identifier identifies a particular database, in the particular data store, that contains the detected instance of the target data profiles. A table name identifier identifies a particular table, in the particular database, that contains the detected instance of the target data profiles. A column name identifier identifies the column name associated with a particular column that contains the detected instance of the target data profiles. A column type identifier identifies a data type (e.g., date, integer, timestamp, character string, decimal, etc.). A target data entity identifier identifies the target data profile that was matched in the detected instance. A confidence score identifies a confidence associated with the classification.

Historical peak signal attribute records 254 represent attributes of peak signals detected from historical data, for example data obtained from external data sources 122. An example historical peak signal attribute record associates a peak signal value with instance(s) of data classifications, such as sensitive data types. This historical data can be utilized to obtain peak signal values 255 for particular cloud assets, based on instances of the data classifications identified in those cloud assets. Peak signal tuning factors or settings 256 can be applied to the instances of the data classifications, such as by weighting those occurrences, to obtain the peak signal values 255. For example, tuning factors can be utilized for user customization of the generation of the peak signal values 255.

Figure 4:
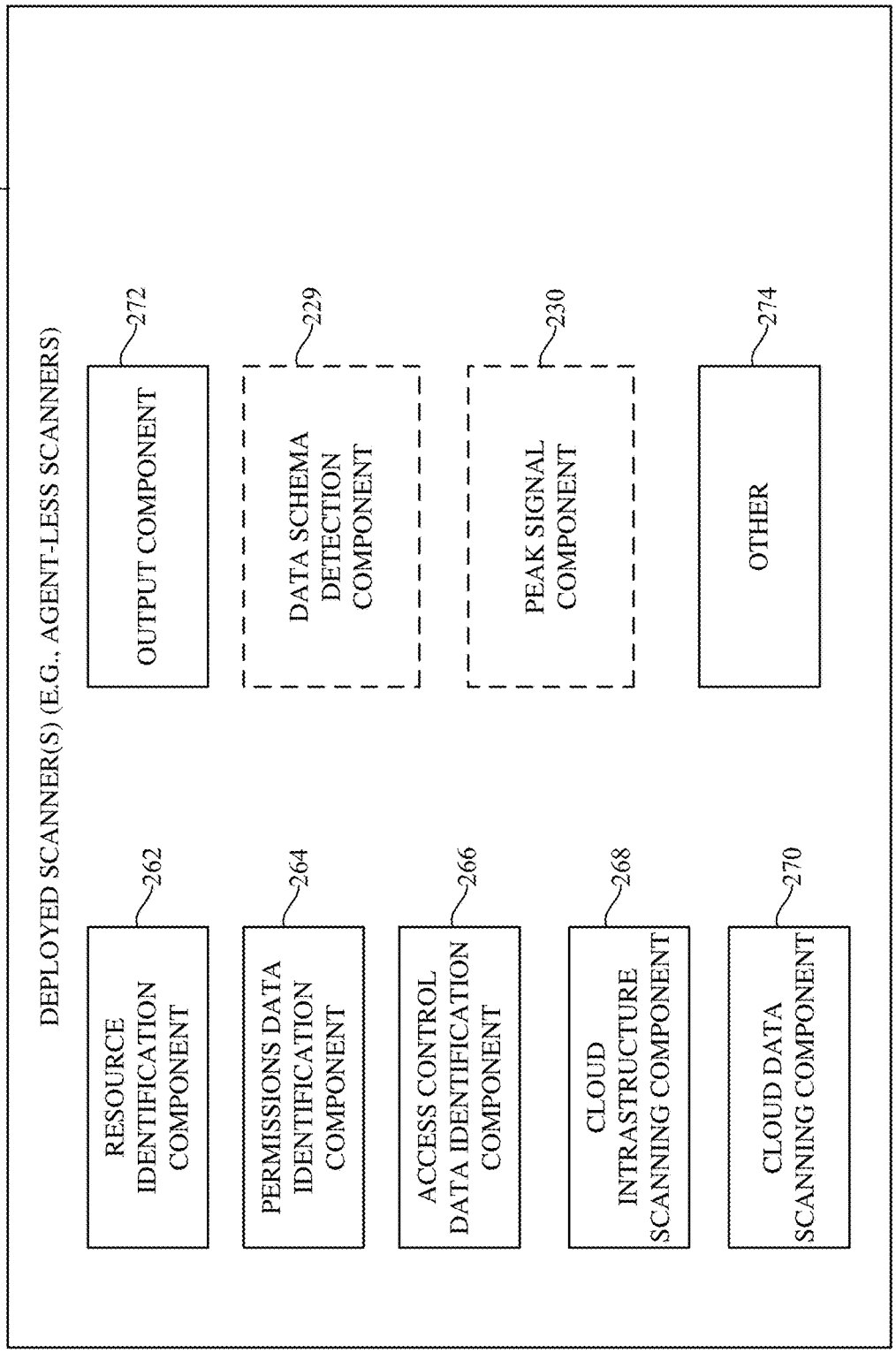
FIG. 4 is a block diagram illustrating one example of a deployed scanner.

FIG. 4 is a block diagram illustrating one example of a deployed scanner 148. Scanner 148 can be deployed locally in the cloud environment using an elastic compute resource, such as an AWS lambda instance, in the cloud environment. Scanner 148 includes a resource identification component 262, a permissions data identification component 264, an access control data identification component 266, a cloud infrastructure scanning component 268, a cloud data scanning component 270, an output component 272, and can include other items 274 as well. FIG. 4 also illustrates that some or all components of and/or functionality performed by data schema detection component 229 and/or peak signal component 230 can be on or otherwise associated with deployed scanner 148.

Resource identification component 262 is configured to identify the resources 126 within cloud service 114-1 (and/or other cloud services 114) and to generate corresponding metadata that identifies these resources. Permissions data identification component 264 identifies the permissions data 136 and access control data identification component 266 identifies access control data 138. Cloud infrastructure scanning component 268 scans the infrastructure of cloud service 114 to identify the relationships between resources 130 and 132 and cloud data scanning component 270 scans the actual data stored in storage resources 132. Output component 272 is configured to output the generated metadata and content-based classification results to cloud security posture analysis system 112.

The metadata generated by scanner 148 can indicate a structure of schema objects in a data store. For example, where the schema objects comprise columns in a data store having a tabular format, the returned metadata can include column names from those columns. A content-based data item classifier is configured to classify data items within the schema objects, based on content of those data items. Examples are discussed in further detail below.

Figure 5:
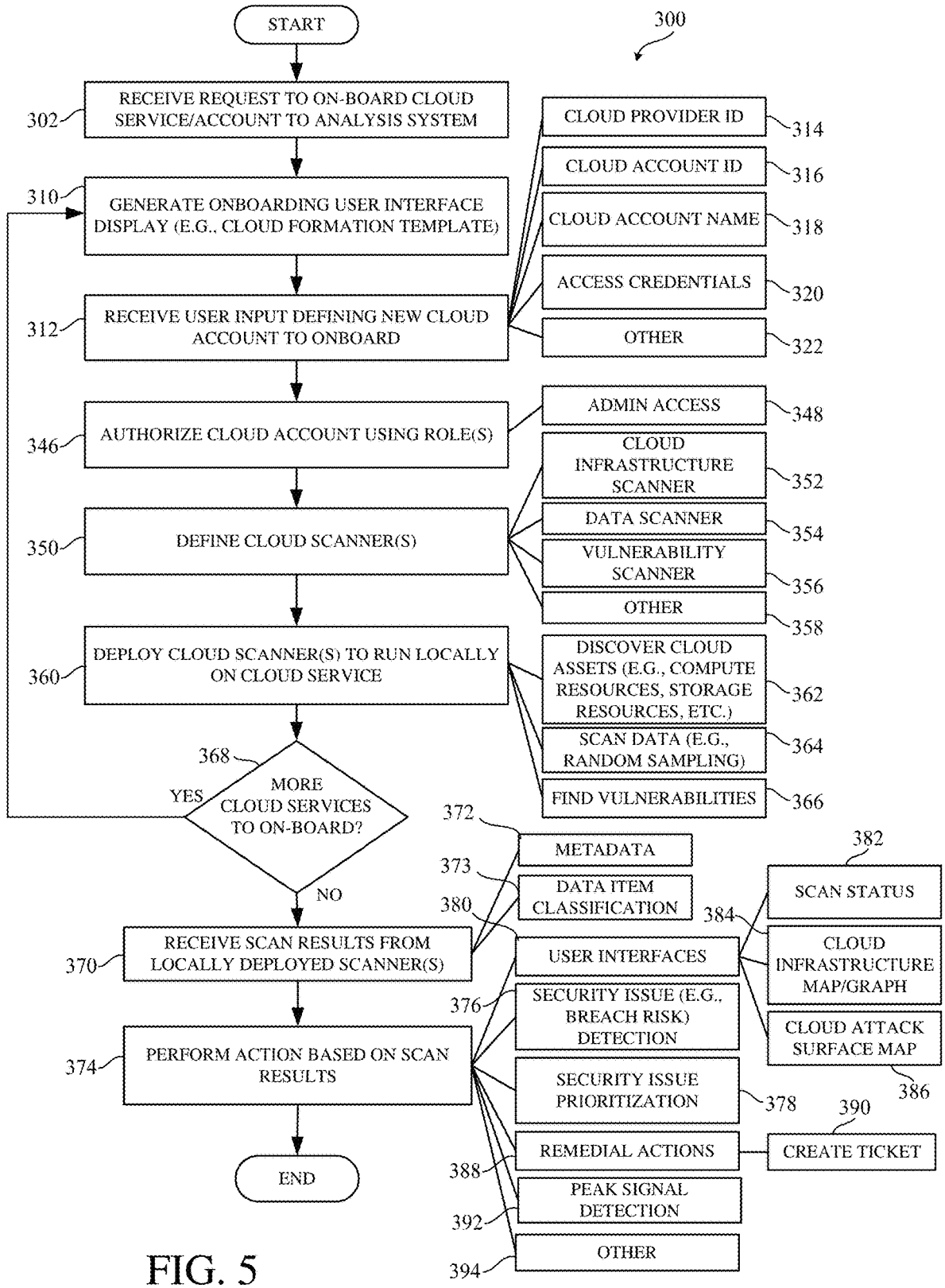
FIG. 5 is a flow diagram showing an example operation of on-boarding a cloud account and deploying one or more scanners.

FIG. 5 is a flow diagram 300 showing an example operation of system 112 for on-boarding a cloud account and deploying one or more scanners. At block 302, a request to on-board a cloud service to cloud security posture analysis system 112 is receives. For example, an administrator can submit a request to on-board cloud service 114-1.

Figure 6:
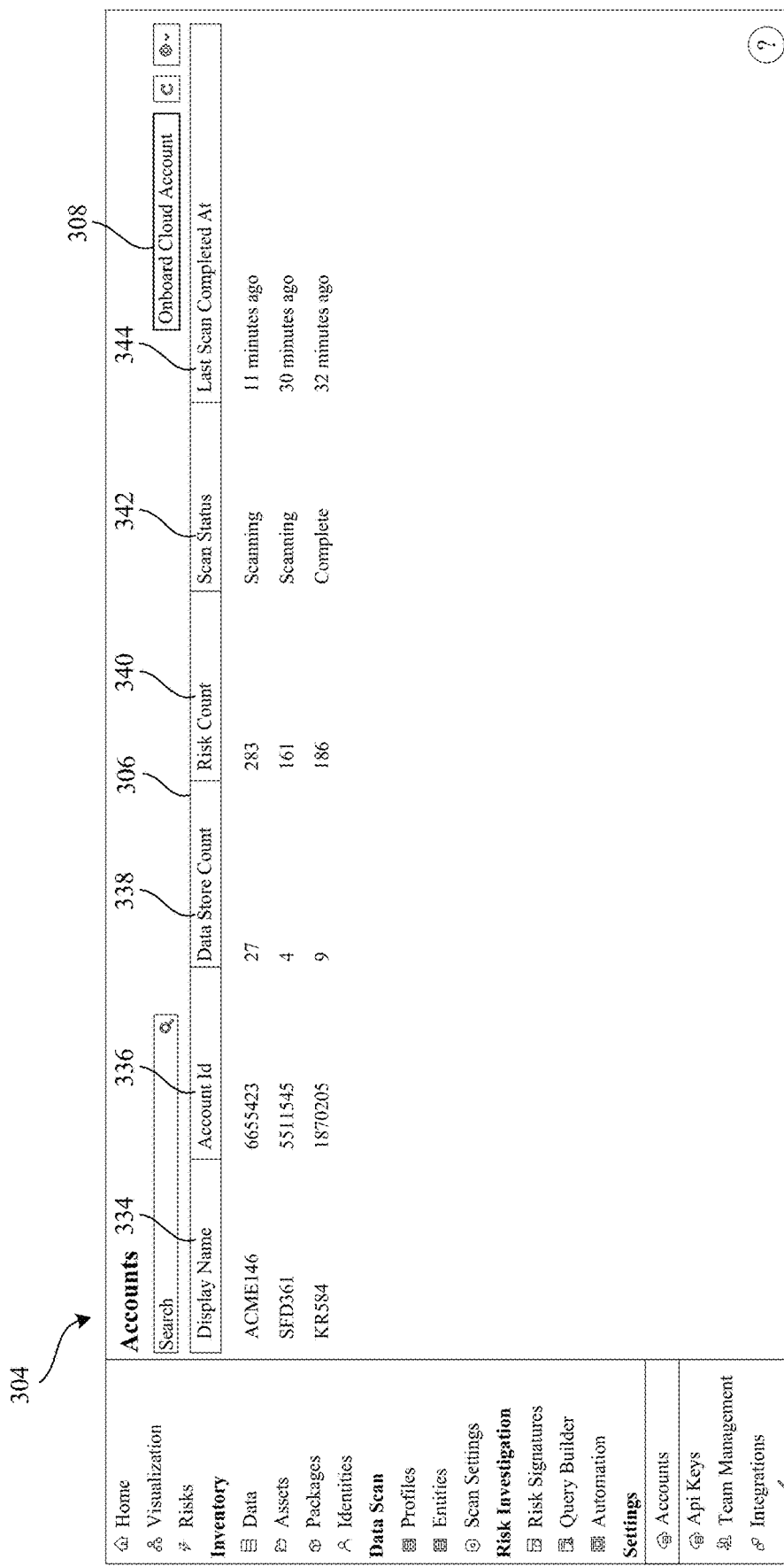
FIG. 6 illustrates one example of a user interface display representing on-boarded cloud accounts.

FIG. 6 illustrates one example of a user interface display 304 provided for an administrator. Display 304 includes a display pane 306 including a number of display elements representing cloud accounts that have been on-boarded to system 112. Display 304 includes a user interface control 308 that can be actuated to submit an on-boarding request at block 302.

Referring again to FIG. 5, at block 310, an on-boarding user interface display is generated. At block 312, user input is received that defines a new cloud account to be on-boarded. The user input can define a cloud provider identification 314, a cloud account identification 316, a cloud account name 318, access credentials to the cloud account 320, and can include other input 322 defining the cloud account to be on-boarded.

Figure 7:
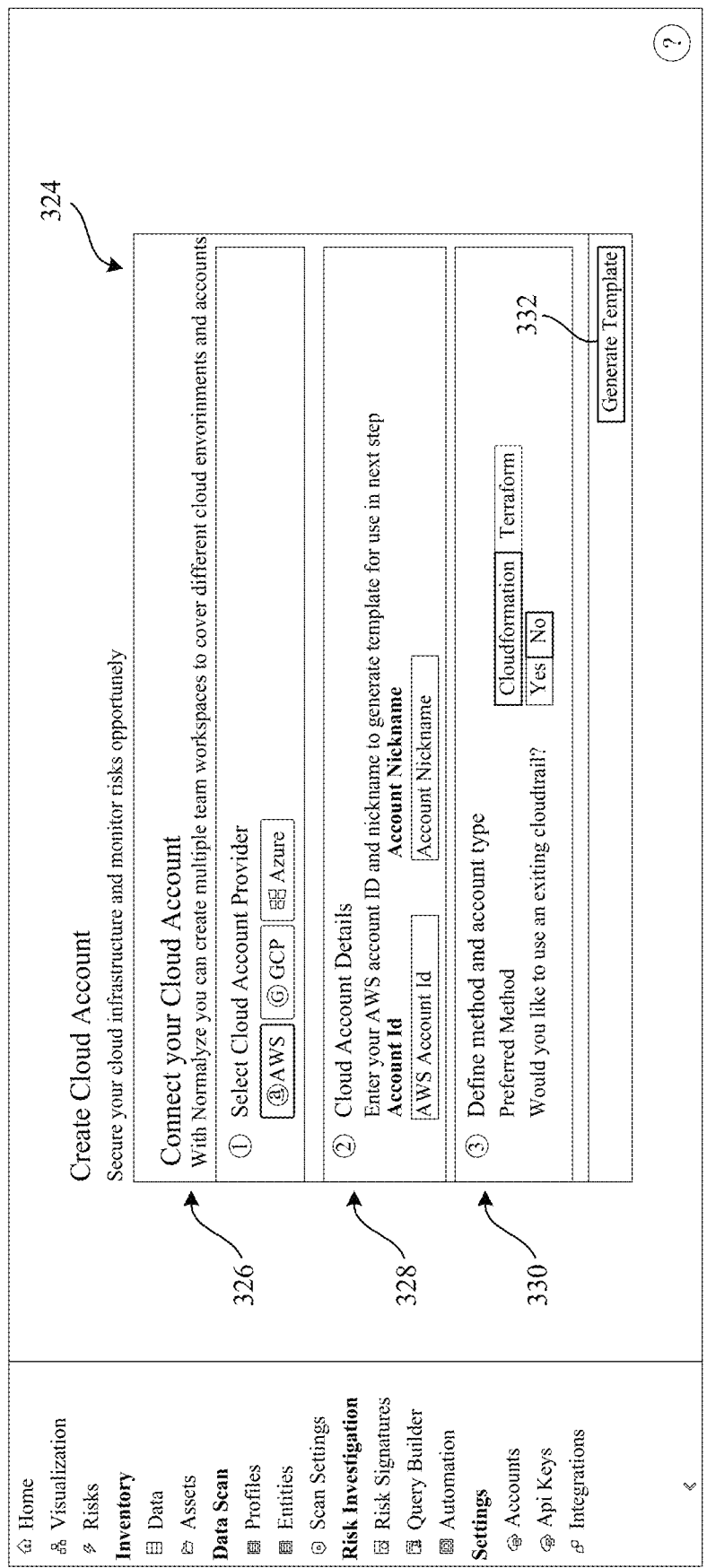
FIG. 7 illustrates one example of an on-boarding user interface display.

FIG. 7 illustrates one example of an on-boarding user interface display 324 that is displayed in response to user actuation of control 308.

Display 324 includes a user interface mechanism 326 configured to receive input to select or otherwise define a particular cloud account provider. In the illustrated example, mechanism 326 includes a plurality of selectable controls representing different cloud providers including, but not limited to, AWS, GCP, Azure.

Display 324 includes a user input mechanism 328 configured to receive input defining a cloud account identifier, and an account nickname. User input mechanisms 330 allow the user to define other parameters for the on-boarding. A user input mechanism 332 is actuated to generate a cloud formation template, or other template, to be used in the on-boarding process based on the selected cloud account provider.

Once the cloud account is connected to system 112, display 304 in FIG. 6 can be updated to show the details of the cloud account as well as the scan status. In FIG. 6, each entry includes a display name 334, an account ID 336, a data store count 338, and a risk count 340. Data store count 338 includes an indication of the number of data stores in the cloud account and the risk count 340 includes an indication of a number if identified security risks. A field 342 indicates the last scan status, such as whether the last scan has completed or whether the scanner is currently in progress or currently scanning. A field 344 indicates the time at which the last scan was completed.

Referring again to FIG. 5, at block 346, the cloud account is authorized using roles. For example, administrator access (block 348) can be defined for the cloud scanner using IAM roles. One or more cloud scanners are defined at block 350 and can include, but are not limited to, cloud infrastructure scanners 352, cloud data scanners 354, vulnerability scanners 356, or other scanners 358.

At block 360, the cloud scanners are deployed to run locally on the cloud service, such as illustrated in FIG. 2. The cloud scanners discover cloud assets at block 362. The cloud assets can include, but are not limited to, compute resources (such as elastic compute resources), storage resources, or other types of resources. At block 364, the data is scanned. In one example, scanning data can include selecting a random portion of the cloud asset in scanning only that randomly selected portion. Further, the results can be utilized to extrapolate characteristics for the entire cloud asset, which can reduce the processing time and bandwidth requirements in scanning the cloud environment.

At block 366, vulnerabilities are identified based on finding a predefined risk signature in the cloud service resources. The risk signatures can be queried upon, and define expected behavior within the cloud service and locate anomalies based on this data.

At block 368, if more cloud services are to be on-boarded, operation returns to block 310. At block 370, the scan results from the deployed scanners are received. As noted above, the scan results include metadata (block 372) and/or data item classifications (block 373) generated by the scanners running locally on the cloud service.

At block 374, one or more actions are performed based on the scan results. At block 376, the action includes security issue detection. For example, a breach risk on a particular resource (such as a storage resource storing sensitive data) is identified. At block 378, security issue prioritization can be performed to prioritize the detected security issues. Examples of security issue detection and prioritization are discussed in further detail below. Briefly, security issues can be detected by executing a query against the scan results using vulnerability or risk signatures. The risk signatures identify criterion such as accessibility of the resources, access and/or permissions between resources, and data types in accessed data stores. Further, each risk signature can be scored and prioritized based impact. For example, a risk signature can include weights indicative of likelihood of occurrence of a breach and impact if the breach occurs.

The action can further include providing user interfaces at block 380 that indicate the scan status (block 382), a cloud infrastructure representation (such as a map or graph) (block 384), and/or a cloud attack surface representation (map or graph) (block 386). The cloud attack surface representation can visualize vulnerabilities.

Remedial actions can be taken at block 388, such as creating a ticket (block 390) for a developer or other user to address the security issues. In another example, a data policy can be automatically created and/or implemented to address vulnerabilities or other security issues. For example, the system can make adjustments to cloud account settings/configurations to address/remedy detected security issues.

At block 392, peak signal detection can be performed based on the scan results, to identify peak signals for cloud assets in the cloud environment. Of course, other actions can be taken at block 394.

Figure 8:
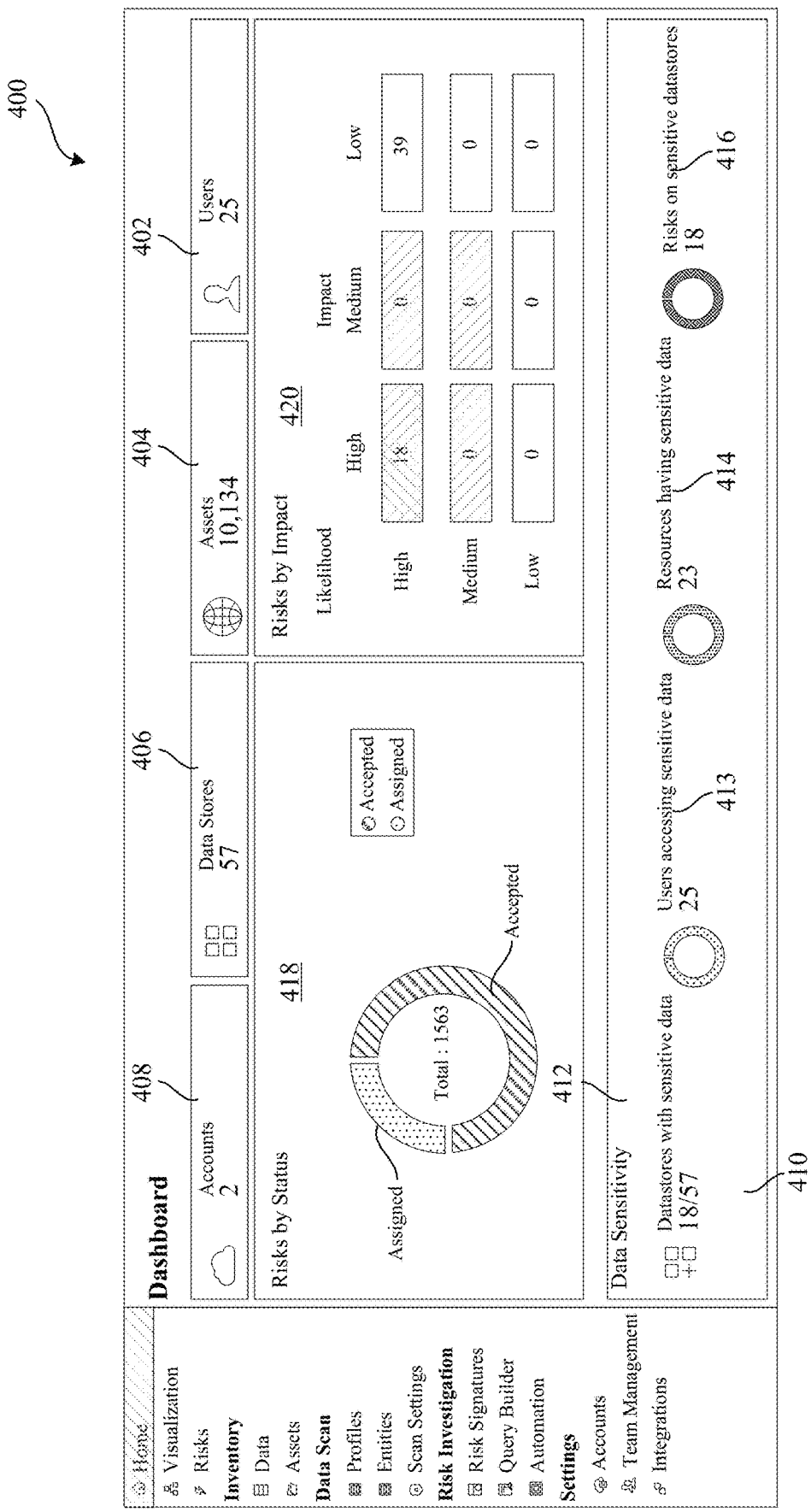
FIG. 8 illustrates one example of a user interface display having a dashboard representing on-boarded cloud service accounts.

FIG. 8 illustrates one example of a user interface display 400, that can be displayed at block 376. Display 400 provides a dashboard for a user which provides an overview of on-boarded cloud service accounts. The dashboard identifies a number of users 402, a number of assets 404, a number of data stores 406, and a number of accounts 408. A data sensitivity pane 410 includes a display element 412 that identifies a number of the data stores that include sensitive data, a display element 413 that identifies a number of users with access to the sensitive data, a display element 414 that identifies a number of resources having sensitive data, and a display element 416 that identifies a number of risks on the data stores having sensitive data. Further, graphs or charts can be generated to identify those risks based on factors such as status (display element 418) or impact (display element 420).

Display element 420 illustratively categorizes the risks based on impact as well as the likelihood of occurrence of those risks. Risk categorization is discussed in further detail below. Briefly, however, display element 420 stratifies one or more of breach likelihood scores or breach impact scores categories representing different levels of severity, such as high, medium, and low severity levels. In one example, display element 420 is color coded based on the degree of impact of the risk (e.g., high impact is highlighted in red, medium impact is highlighted in yellow, and low impact is highlighted in green).

Figure 9:
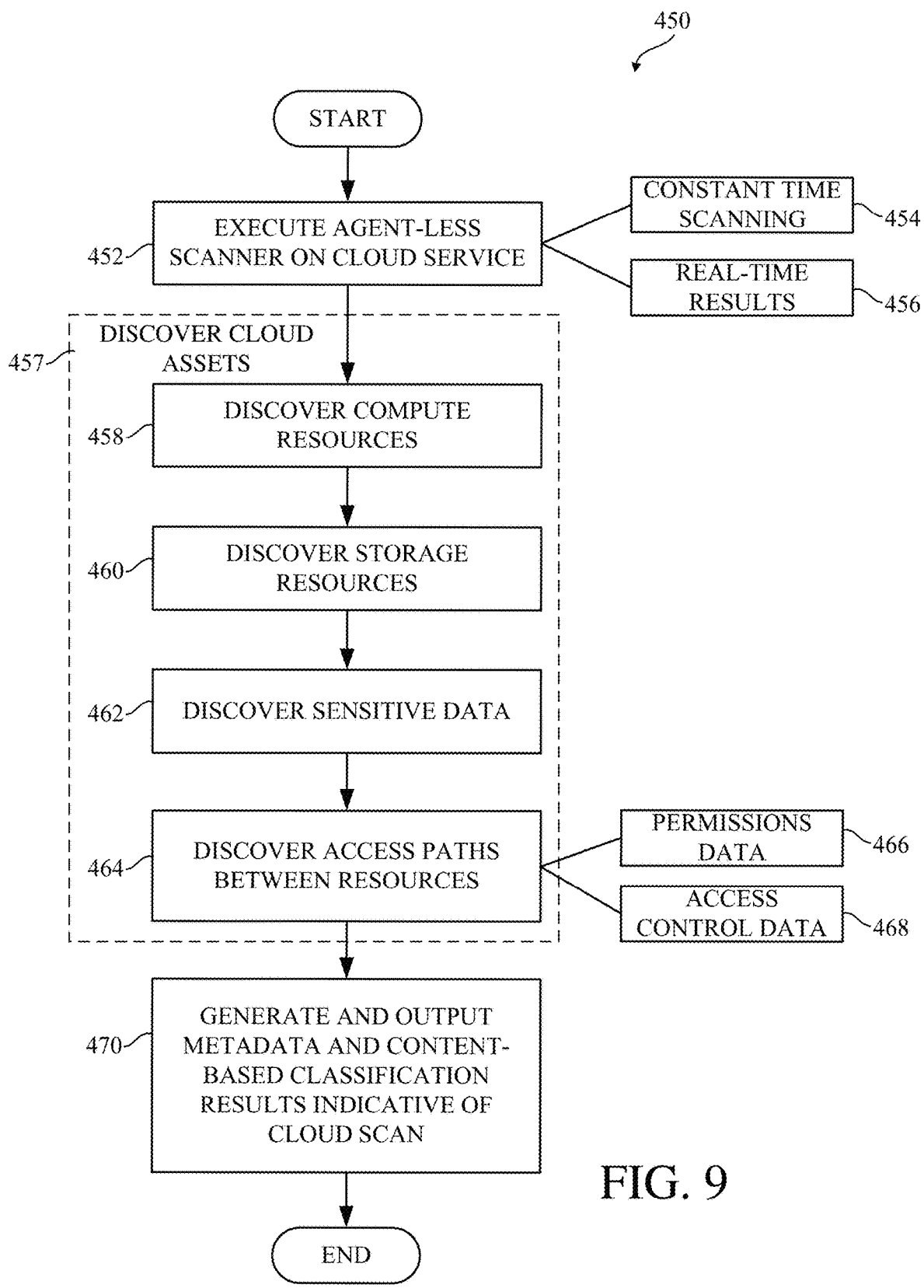
FIG. 9 is a flow diagram illustrating one example of cloud infrastructure scanning performed by a cloud scanner deployed in a cloud service.

FIG. 9 is a flow diagram 450 illustrating one example of cloud infrastructure scanning performed by cloud scanner 148 deployed in cloud service 114-1. At block 452, an agent-less scanner is executed on the cloud service. The scanner can perform constant time scanning at block 454.

An example constant time scanner runs an algorithm in which the running time does not depend, or has little dependence on, the size of the input. The scanner obtains a stream of bytes and looks for a multiplicity of patterns (one hundred patterns, two hundred patterns, three hundred patterns, etc.) in one pass through the stream of bytes, with the same or substantially similar performance.

Further, the scanner can return real-time results at block 456. Accordingly, system 112 receives updates to the security posture data as changes are made to the cloud services.

At block 457, the scanner discovers cloud assets based on execution of the scanner. Block 457 can include, at block 458, the scanner discovering the compute resources 130 and, at block 460, the storage resources 132. Sensitive data can be discovered at block 462. The agent-less scanner does not require a proxy or agent running in the cloud service, and can utilize server-less containers and resources to scan the documents and detect sensitive data. The data can be accessed using APIs associated with the scanners. The sensitive data can be identified using pattern matching, such as by querying the data using predefined risk signatures.

At block 464, access paths between the resources are discovered based on permissions data 136 (block 466), and/or access control data 138 (block 468). A rule processing engine, such as using JSON metadata, can be utilized to analyze the roles and policies, and can build access relationships between the nodes representing the resources. The policies can be decoded to get access type (allow, deny, etc.) and the policy can be placed in a node to link from a source to target node and create the access relationship. At block 470, metadata and/or content-based classification results indicative of the scanning is generated and outputted by output component 272.

Figure 10:
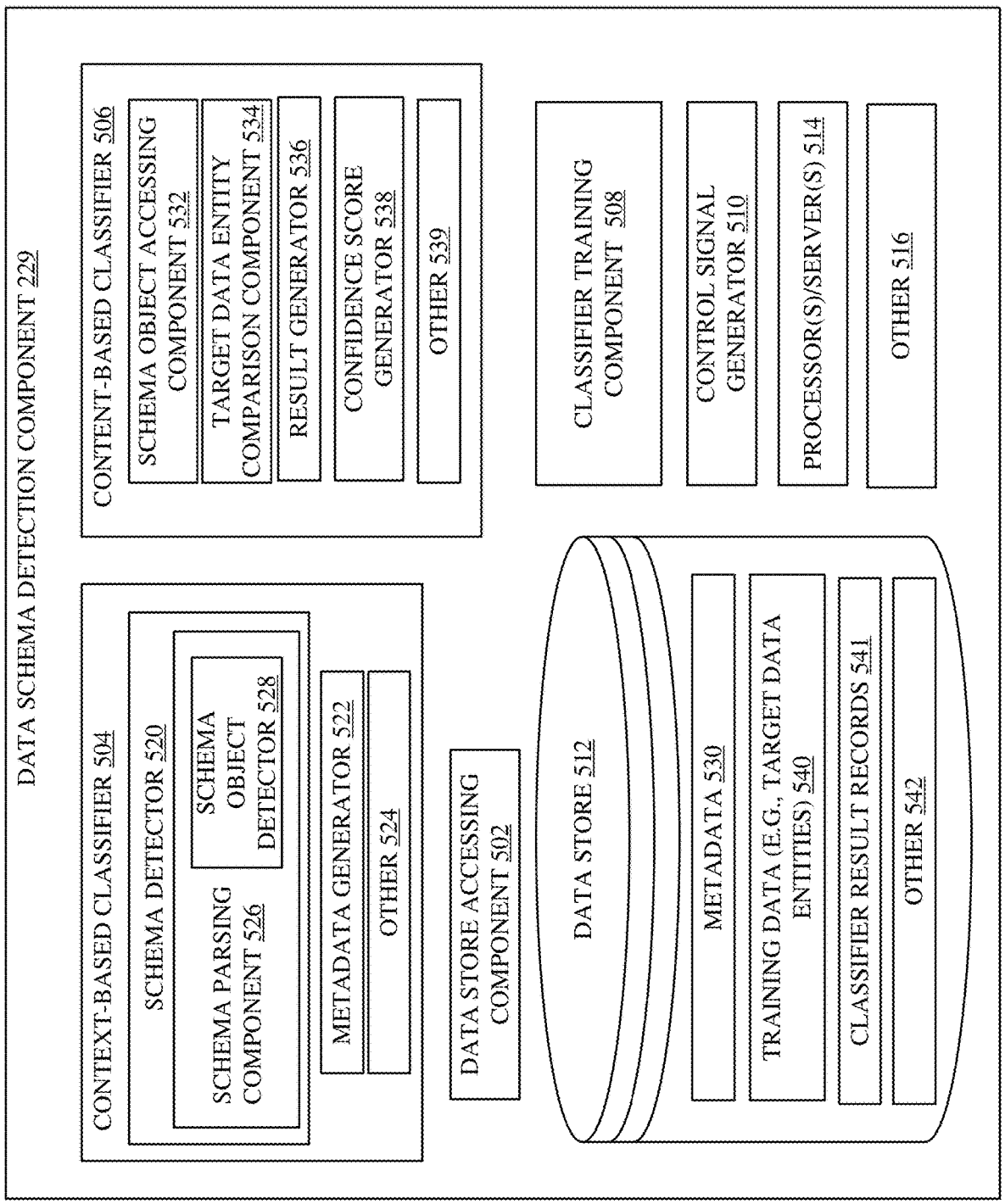
FIG. 10 is a block diagram illustrating one example of a data schema detection component.

FIG. 10 illustrates one example of data schema detection component 229. Component 229 includes a data store accessing component 502, a context-based classifier 504, a content-based classifier 506, a classifier training component 508, a control signal generator 510, a data store 512, one or more processors or servers 514, and can include other items 516 as well.

Data store accessing component 502 is configured to access data stores to be analyzed. Context-based classifier 504 includes a schema detector 520, a metadata generator 522, and can include other items 524 as well. Schema detector 520 is configured to detect a schema used by the data store, and includes a schema parsing component 526, which includes a schema object detector 528. For sake of illustration, but not by limitation, in an example structured database, the data stores store data according to a defined format, such as a table format, JavaScript object notation (JSON), to name a few. The data stores can be accessed using a database management system, such as mySQL, Mongo DB, to name a few. Thus, schema object detector 528 identifies the particular schema objects in the database structure and metadata generator 522 generates metadata that identifies the detected schema objects along with relationship data that identifies relationships between those schema objects. The metadata can be stored as metadata 530 in data store 512.

However, in some instance, the metadata can provide some level of context, but may not accurately represent the actual content items. For example, the returned metadata can include column names of columns in a tabular data store, but the column names may not accurately represent the actual data items in the corresponding columns. For instance, sensitive data, such as financial data, personal data, etc. can be stored in a column having a column name that identifies the column as including something other than sensitive data (e.g., a customer phone number can be stored in a product description column). In turn, data posture analysis performed using such metadata can be inaccurate and fail to identify potential data security vulnerabilities.

Content-based classifier 506 is configured to perform content-based classification to classify data items in the schema objects identified by context-based classifier 504. Content-based classifier 506 includes a schema object accessing component 532, a target data entity comparison component 534, a result generator 536, a confidence score generator 538, and can include other items 539 as well. Schema object accessing component 532 is configured to access the schema objects detected by schema object detector 528. For example, component 532 can identify and access columns in a table using the stored metadata 530.

Data store 512 can also store training data 540, classifier result records 541, and can store other items 542 as well. Training data 540 illustratively includes target data profiles (also referred to as target data profiles or entities 540) that represent a collection of different data types to be used in performing the content-based classification. For example, training data 540 can include sensitive data profiles 252, which can represent sensitive data types, patterns, and/or signatures. Examples include various types of financial data, such as, but not limited to, credit card numbers, bank account numbers, etc. Also, the training data 540 can identify personal information, such as social security numbers, phone numbers, email addresses, etc.

For sake of illustration, but not by limitation, an example target data profile for an internet protocol (IP) address indicates a form "x.x.x.x", where x is an octet and must be a decimal value between zero and two hundred and fifty five. As another example, a target data profile for a credit card number indicates a string of fifteen or sixteen characters that begins with a three, four, or five.

Training data 540 be stored, updated, and removed in any of a number of ways. For example, a user can define new target data profiles to be detected, modify existing target data profiles, etc.

Content-based classifier 506 can perform content-based classification using target data entity comparison component by comparing the data items to predefined target data profiles. Classifier training component 508 is configured to training the content-based classifier by using the training data 540. The content-based classifier can be any of a wide variety of classifiers including, but not limited to, a rules-based classifier, a machine learned classifier (e.g., a deep learning system), a heuristics-based classifier, or other type of classifier or classification model.

An example classifier includes a classification engine that evaluates extracted content, extracted from the schema objects, and content metadata based on a content rule or model, trained with the training data. For example, a portion of content can be matched to a content rule if a characteristic of the content satisfies a condition of the content rule. For instance, a classifier can compare the extracted content to the target data profiles using one or more similarity measures. A similarity measure can be used by the classifier to determine whether a data item extracted from a content object is determined to match a given target data profile. Examples of similarity measures include, but are not limited to, k-gram overlap, edit distance, Cosine similarity, Manhatten distance, Euclidean distance, Levenshtein distance, to name a few.

Figure 11:
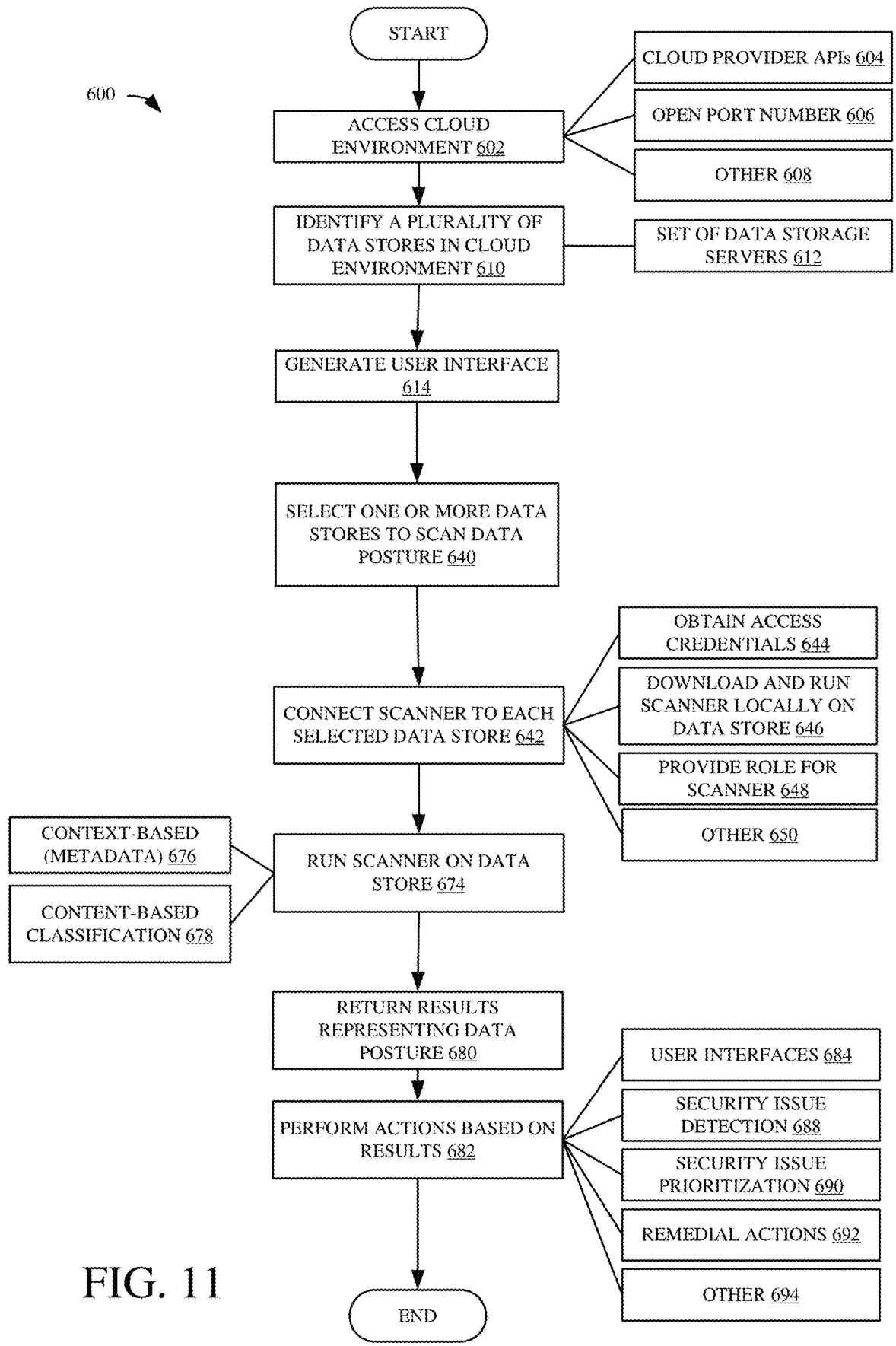
FIG. 11 is a flow diagram illustrating one example of scanning data stores in a cloud environment.

FIG. 11 is a flow diagram 600 illustrating one example of scanning data stores in a cloud environment. For sake of illustration, but not by limitation, FIG. 11 will be discussed in the context of cloud data/security posture analysis system 112.

At block 602, system 112 accesses a cloud account in a cloud environment onboarded by cloud account onboarding component 202. Onboarding can be done in any of a number of ways. For example, the cloud environment can be accessed through a cloud provider application programming interface (API) at block 604. The cloud environment can also be accessed using open port numbers at block 606. Of course, the cloud environment can be accessed in other ways as well, as represented at block 608.

At block 610, a plurality of data stores is identified in the cloud environment. In one example, the plurality of data stores includes a set of data storage servers. Thus, each data store can include a server having one or more databases logically defined thereon, as represented at block 612.

At block 614, a user interface display is generated that displays the identified data stores. One example of a user interface display 616 is illustrated in FIG. 12. As shown in FIG. 12, user interface display 616 includes a display pane 618 that displays the plurality of identified data stores in a tabular format. Each of a plurality of entries is a row in pane 618 and represents one of the data stores. A plurality of columns in pane 618 identify a name (column 620) of the data store, a type (column 622) of the data store, a volume (column 624) of the data store, and a storage engine (column 626) used by the data store. Each entry can also include a likelihood metric (column 628) and an impact metric (column 630), that indicate breach likelihood and breach impact, respectively, for that data store. Examples of determining breach likelihood and impact are discussed above.

Each entry can also identify detected entities (e.g., detected instances of target data entities 540) in the data store. In the illustrated example, column 632 includes one or more display elements 633, where each display element 633 represents a particular target data profile along with a numeric representation of how many instances of the target data profile have been detected in the particular data store. For instance, in FIG. 12, nine instances of the "domain name" profile have been detected in the data store ABC. The display elements can be actuatable to navigate the user to the corresponding instances in the data store.

Each entry can also identify detected composite profiles identified in the data store. In the illustrated example, column 634 includes one or more display elements 635, wherein each display element 635 represents a particular composite profile along with a numeric representation of how many instances of the target data profile have been detected in the particular data store. A composite profile includes combinations of target data profiles (e.g., entities 540). Examples are discussed below. Briefly, a composite profile can include two or more different data entities within a threshold proximity (e.g., a same row in a table, a threshold number of words, etc.). For instance, in FIG. 12, twenty-three instances of the "person" profile have been detected within a threshold proximity of the "email" profile in the data store ABC.

A user can navigate to display pane 618 to visualize the structured databases through actuation of a structured database control 636. The user can also navigate between the data stores, databases, tables, and columns within the data store, through a set of controls 638.

Referring again to FIG. 11, at block 640, one or more data stores are selected to scan. At block 642, one or more scanners are connected to each selected data store. Connecting a data store can be performed in any of a number of ways. At block 644, access credentials can be obtained for each selected data store. For example, the user can enter a username and password for a data store, which is stored by the scanner to obtain access to the data for subsequent scanning.

In another example, at block 646, the scanner can be downloaded and run locally on the data store. At block 648, a role can be provided to the scanner, which allows the scanner to access data stores in the cloud environment through the role (such as a cloud provider role, etc.). Of course, a scanner can be connected to the data stores in other ways as well, as represented at block 650.

Figure 13:
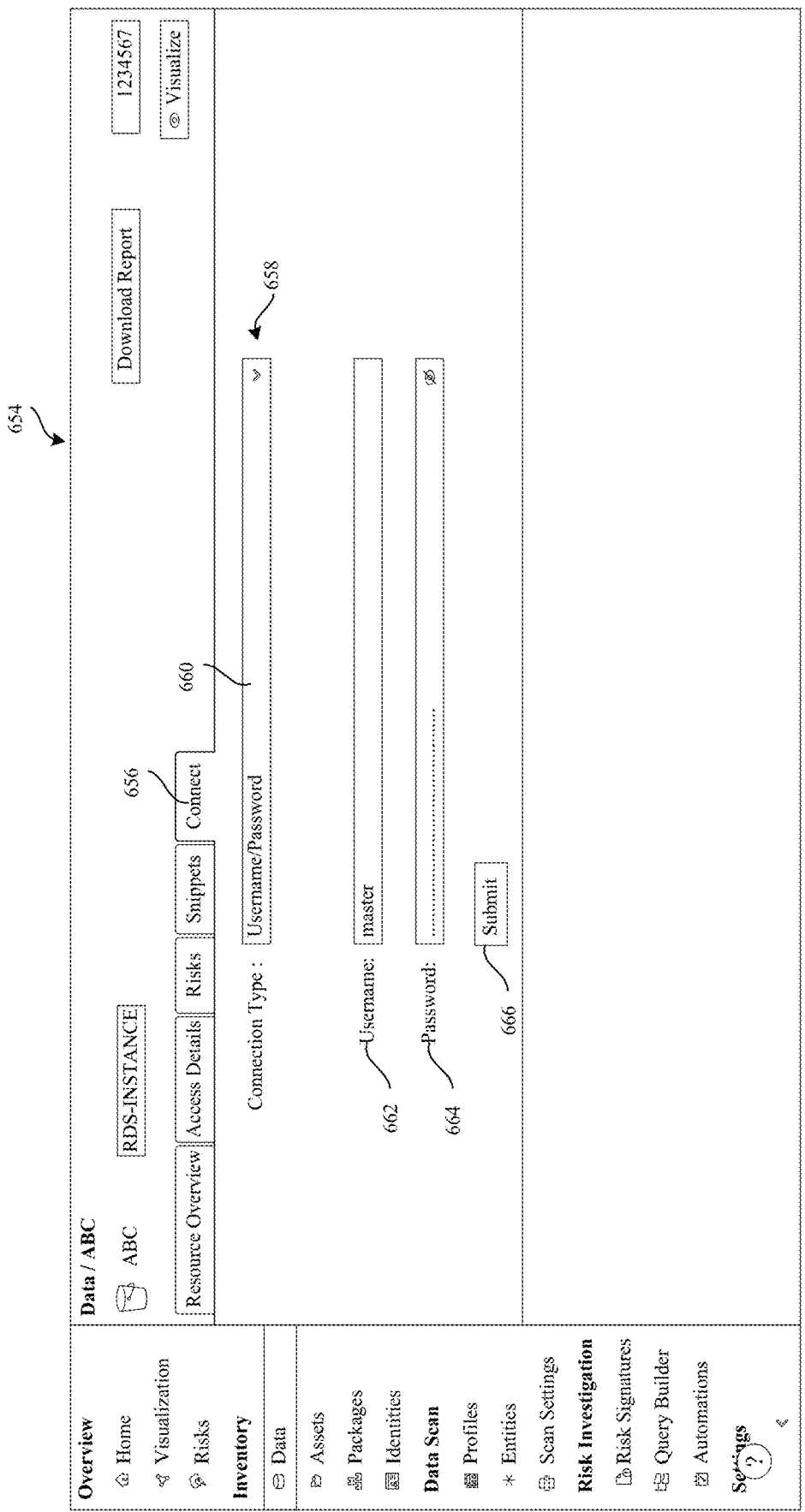
FIG. 13 illustrates an example user interface display for connecting a data store.

In FIG. 12, one example of selecting a data store includes user actuation of a database selection control 652. In response to actuation of control 652, a user interface is displayed for connecting the data store corresponding to the selected control 652 (data store "ABC" in the present example). FIG. 13 illustrates one example of a user interface display 654 for connecting the data store.

Figure 14:
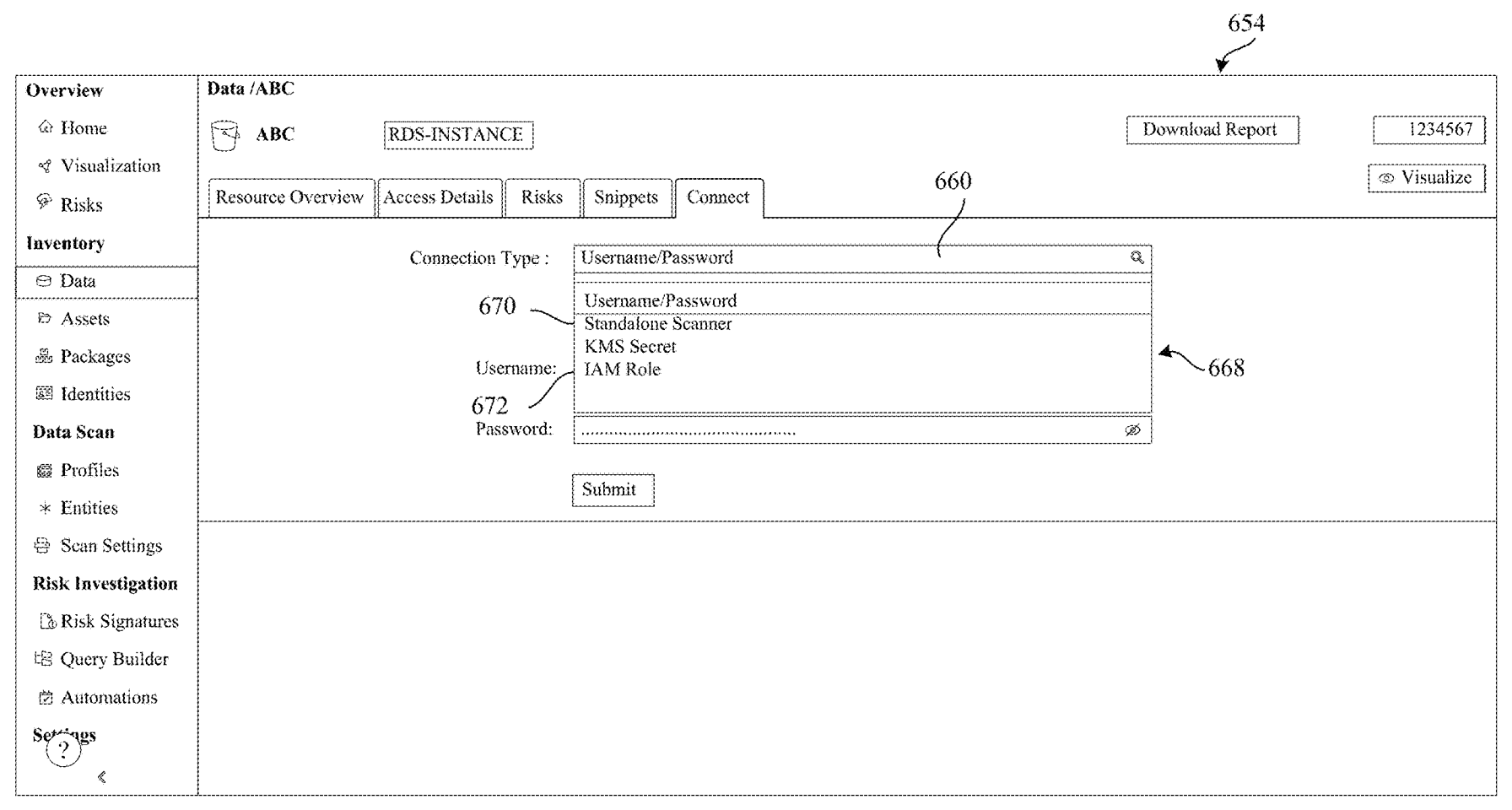

As shown in FIG. 13, user interface display 654 includes a data store connection display tab 656 actuatable to provide user input mechanisms 658 for entering access credentials for the data store. User input mechanisms 658 include a connection type input mechanism 660 actuatable to select the connection type, for example from a drop-down menu. In the example of FIG. 13, a "username/password" connection type is selected, and a username input mechanism 662 and a password input mechanism 664 are rendered for receiving a username and password, respectively, for the data store "ABC". The user enters the username and password and submits the access credentials by actuating control 666. FIG. 14 illustrates user interface display 654 where a user has actuated mechanism 660 and is provided with a set of selectable connection type options 668. Here, a drop-down menu includes, in addition to the username/password connection type, a standalone scanner connection type 670 actuatable to download and run the scanner locally on the data store. Another connection type control 672 is selectable to provide a cloud provider role to the scanner for accessing the data store.

Referring again to FIG. 11, at block 674 the scanner is run on the data store to perform context-based classification at block 676 and content-based classification at block 678. At block 680, results are returned representing the data posture and one or more actions are performed based on the results at block 682. For example, one or more user interfaces can be generated at block 684 providing the results of the scan, as well as providing user input mechanisms for a user to interact with the results, for example to drill up or drill down in the results, perform remedial actions, etc. At block 688, security issue detection can be performed to detect security issues based on the scan results. In one example, security issue prioritization is performed at block 690. Examples of security issue detection and prioritization are discussed above. Remedial actions are illustrated at block 692. Of course, other actions can be performed at block 694.

Figures 1, 15:
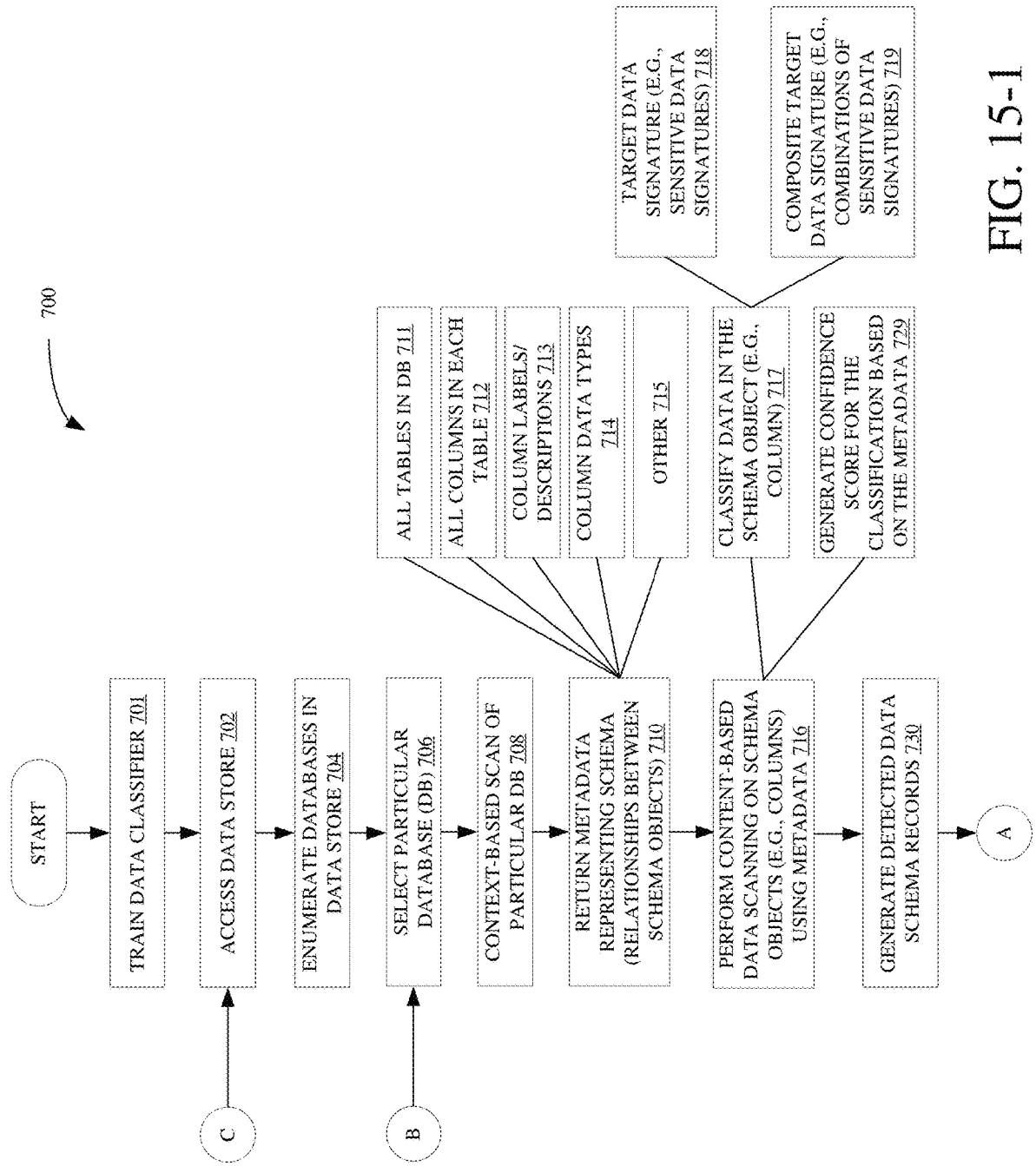
Figures 2, 15:
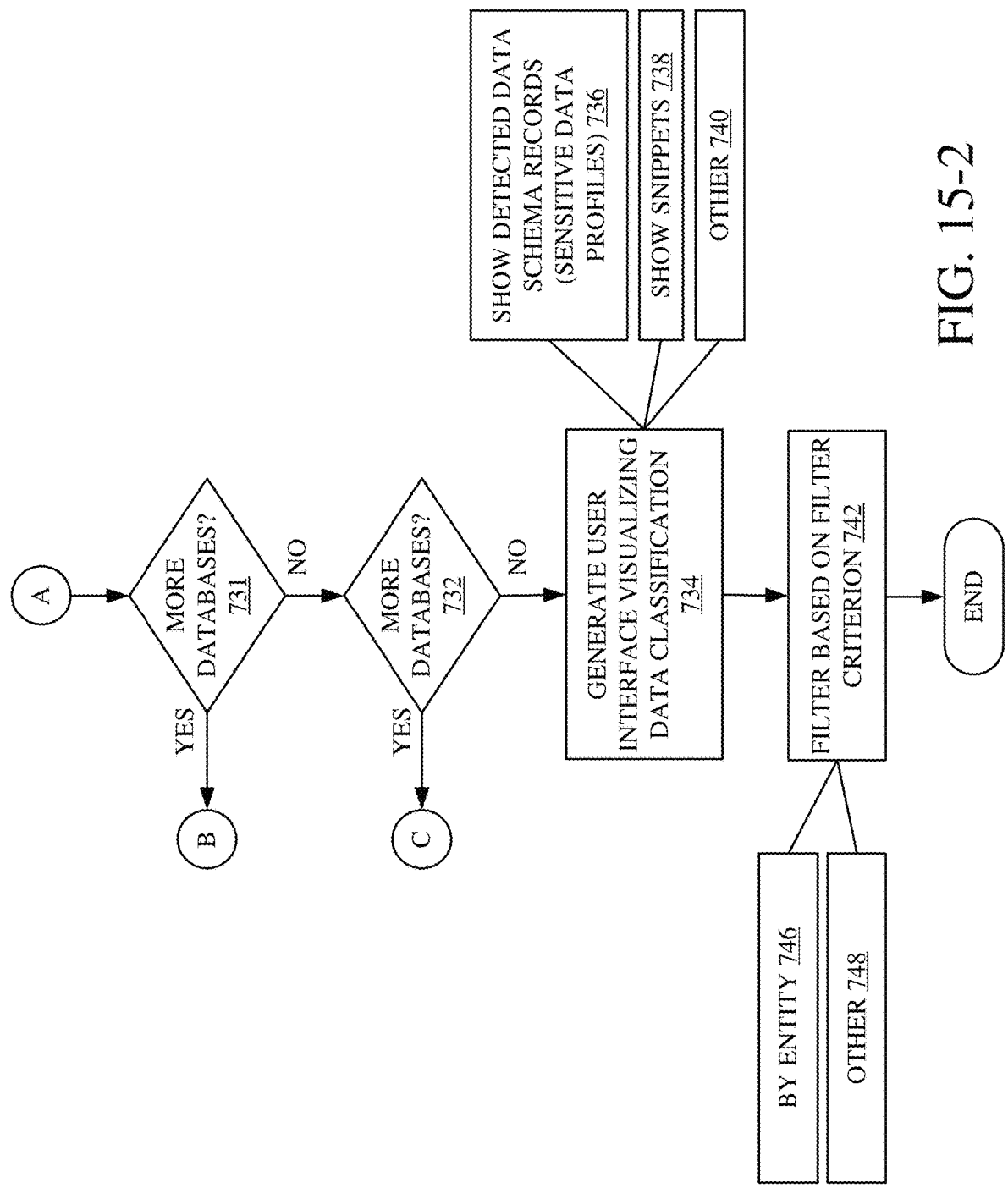

FIGS. 15-1 and 15-2 (collectively referred to as FIG. 15) provide a flow diagram 700 illustrating one example of performing content-based classification of data items. For sake of illustration, but not by limitation, FIG. 15 will be discussed in the context of cloud data/security posture analysis system 112.

At block 701, content-based classifier 506 is trained based on training data 540. At block 702, a data store is accessed using, for example, the access credentials obtained at block 1044 and/or the role provided at block 1048. At block 704, databases in the data store are enumerated, for example based on metadata 530 obtained from data store 512. For instance, the metadata 530 can identify a location of and/or include a link to each database.

A first database is selected from the enumerated databases at block 706 and the database is scanned at block 708. At block 710, metadata is returned representing the data schema. For instance, relationship data representing a relationship between a set of schema objects in the database is returned. The metadata can identify all the tables in the database at block 711, and all columns in each table at block 712. Also, the metadata can identify column labels and/or a column description at block 713, and the metadata can identify column data types at block 714. Of course, other metadata can be retuned as well, as represented at block 715.

At block 716, content-based data scanning is performed on the schema objects using the metadata return at block 710. For example, based on the metadata, all schema objects (e.g., all tables and columns) are enumerated and accessed to classify data items in the schema object at block 717. In one example, at block 718, the data is classified based on one or more target data entities, such as one or more of sensitive data profiles 252. Thus, block 718 identifies instances of data profiles 252 in a schema object. At block 719, instances of composite data signatures or profiles can be detected. For example, a composite data profile can include two or more detected entities within a threshold proximity (e.g., a same row in a table, a threshold number of words, etc.). Thus, block 719 obtains the threshold proximity and scans the schema object for occurrences of two or more data profiles within the threshold proximity. For instance, for a "person n email" composite data profile, block 719 scans a table for occurrences of the "person" profile and the "email" profile within a same row of the table. In some instances, an occurrence of a single data profile can indicate a low or moderate data security risk. However, an occurrence of the same data profile in combination with another data profile can indicate of high data security risk. To illustrate, a name or address alone may not be considered personal identifiable information (PII), but a name and address together in a row may be considered PII. Accordingly, usage of composite data profiles can increase the fidelity of the sensitivity of data that is detected and classified.

In one example of block 718, metadata 530 is obtained from data store 512 and used to identify a structure of schema objects in the first database. For instance, the metadata 530 can identify a number of tables and respective columns in the first database. Using this metadata, classifier 560 iteratively selects each column and determines whether any data items in the selected column matches one of the target data profiles to within a similarity measure.

At block 729, a confidence score is generated for the content-based classification based on the metadata. For example, the confidence score is indicative of a confidence level that the data classification is correct based on the metadata.

For instance, confidence score generator 538 can generate a confidence score based on a similarity measure that indicates how similar a data item is to a particular target data profile. If the similarly measure indicates that the data item is a relatively close match (e.g., above a predefined threshold) to the particular target data profile, then a high confidence score is assigned to the classification. Similarly, if the similarly measure indicates that the data item is a relatively distant match (e.g., below a predefined threshold) to the particular target data profile, then a low confidence score is assigned to the classification.

Alternatively, or in addition, the confidence score can be based on metadata 530. For example, the matched target data profile is compared to an indication of the schema object in which an instance of the matched target data profile resides. For instance, if an occurrence of a phone number profile is identified in a column labeled "contact information", then the confidence score is high. Conversely, if an occurrence of the phone number profile is identified in a customer name column, then the confidence score is low.

For sake of illustration, but not by limitation, a first target data profile (i.e., a "phone number entity") for a contact phone number indicates a form of (xxx)xxx-xxxx, where x is a digit between zero and nine. Further, assume a data item "1234567890" in a first table is identified in a column labeled "contact information." In this case, the data item is identified as an instance of a phone number entity and is assigned a high confidence score due to a similarity in the number of characters and that a phone number is likely to occur in a contact information column.

As another illustration, a second target data profile for a social security number indicates a form of xxx-xx-xxxx, where x is a digit between zero and nine, and a third target data profile for a bank routing number indicates nine digits that begins with a zero. Further, assume a data item "123-45-6789" in a second table is identified in a column labeled "payment information." In this case, an instance of a social security number entity can be detected with a medium or high degree of confidence based on the similarity in the number of characters and format, even though there is a relatively low correspondence between the column label and the type of data entity.

At block 730, detected data schema records (e.g., records 541) are generated to represent any detected instances of the target data entities. In the above example, a first detected data schema record is generated for the "1234567890" data item that identifies the data store, the database, and the table in which the data item is stored. The first detected data schema record also stores an identifier that uniquely points to or otherwise identifies the "1234567890" data item within the table (such as by identifying the respective cell in the first table), along with an indication of which target data profile was matched and the confidence score.

At block 731, it is determined whether there are any more databases in the data store to scan. If so, operation returns to block 706. At block 732, it is determined whether there are more data stores to enumerate and scan. If so, the process returns to block 702.

At block 734, a user interface display is generated to visualize the data classification. For example, the visualization can include showing the target data entities at block 736, showing snippets at block 738, or generating other user interface elements at block 740.

At block 742, the results in the user interface can be filtered based on a filter criterion, such as filtering by target data entity at block 746, or filtering based on other filter criterion at block 748.

Figure 16:
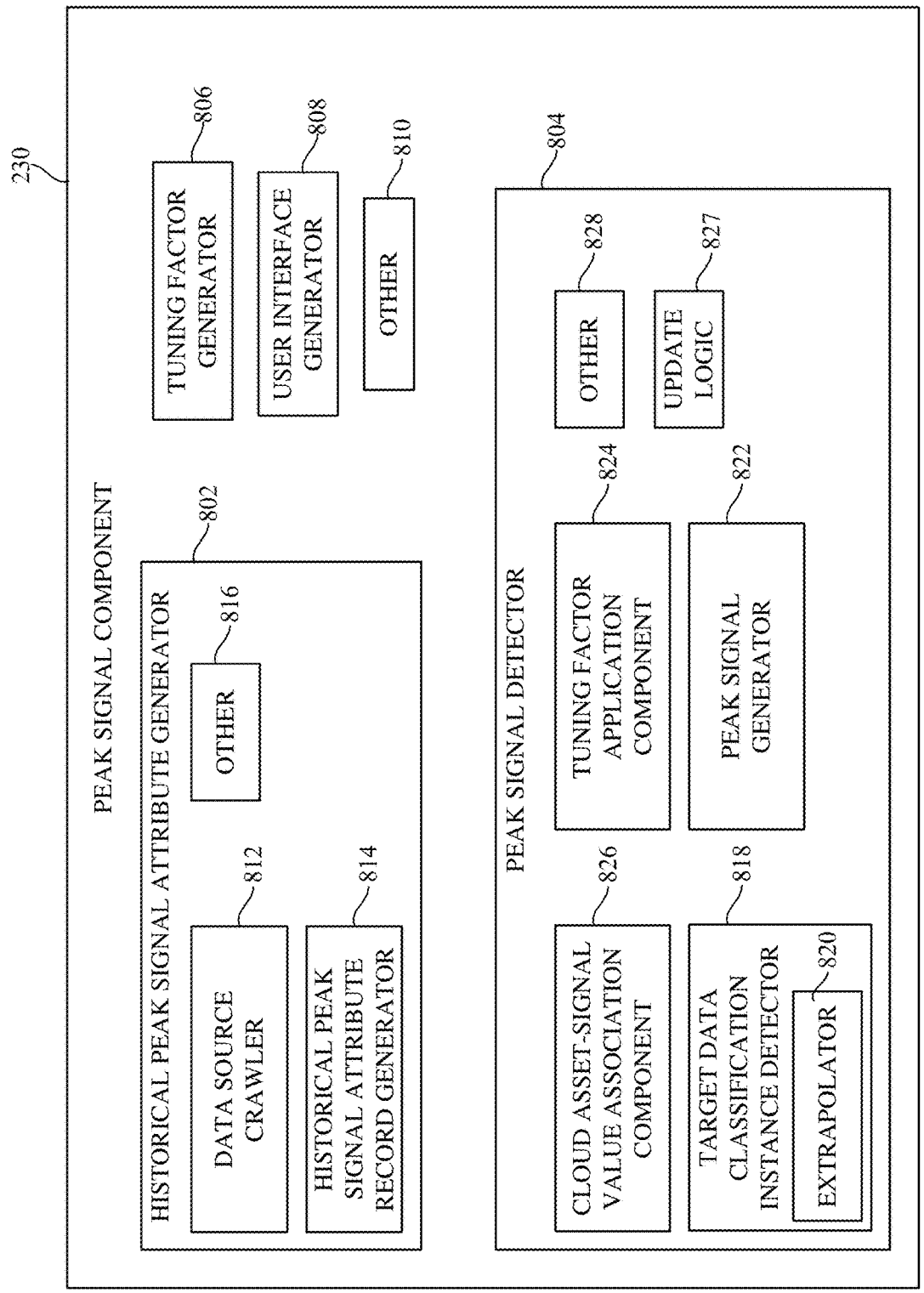
FIG. 16 is a block diagram illustrating one example of a peak signal component.

FIG. 16 is a block diagram illustrating one example of peak signal component 230. Component 230 includes a historical peak signal attribute generator 802, a peak signal detector 804, a tuning factor generator 806, a user interface generator 808, and can include other items 810 as well.

Historical peak signal attribute generator 802 is configured to generate historical peak signal attributes from historical data. For example, a data source crawler 812 is configured to crawl data source(s). A historical peak signal attribute record generator 814 generates records that identify peak signal attributes from the historical data. For instance, crawler 812 can crawl and parse a given data source to identify instances of a data classification (e.g., a particular sensitive data type) and an instance of a peak signal. Generator 814 identifies a correlation between the data classification and the peak signal and generates a record that represents the association, which can be used by peak signal detector 804 to detect peak signals for cloud assets in cloud environment 102. Historical peak signal attribute generator 802 can include other items 816 as well.

Peak signal detector 804 includes a target data classification instance detector 818 configured to detect instances of one or more target data classifications in cloud assets in cloud environment 102. In one example, detector 818 includes an extrapolator to extrapolate data based on a number of detected instances in a portion of the cloud asset. To illustrate, in one example detector 818 selects a particular data store in storage resources 132 and then randomly selects a portion of that data store. For instance, if the data store includes one thousand data records, detector 818 can randomly select one hundred records from those one thousand records in the data store (i.e., one tenth of the data store are selected). If thirty instances of a sensitive data type are detected, extrapolator 820 determines that an estimated three hundred instances of the sensitive data type reside in the data store.

Peak signal detector 804 also includes a peak signal generator 822 configured to generate a peak signal for the cloud asset based on the target data classification instance detected by detector 818. For instance, generator 822 can use a tuning factor applied by tuning factor application component 824. Peak signal detector 804 includes a cloud asset-signal value association component 826 configured to associate the peak signal generated by generator 822 with the given cloud asset. Component 824 can store records indicating the association, such as in data store 210.

Peak signal detector 804 also includes update logic 827. Update logic 827 is configured to update the corresponding peak values, for example in response to user specification. An example of update logic is discussed in further detail below. Of course, detector 804 can include other items 828 as well.

Figure 17:
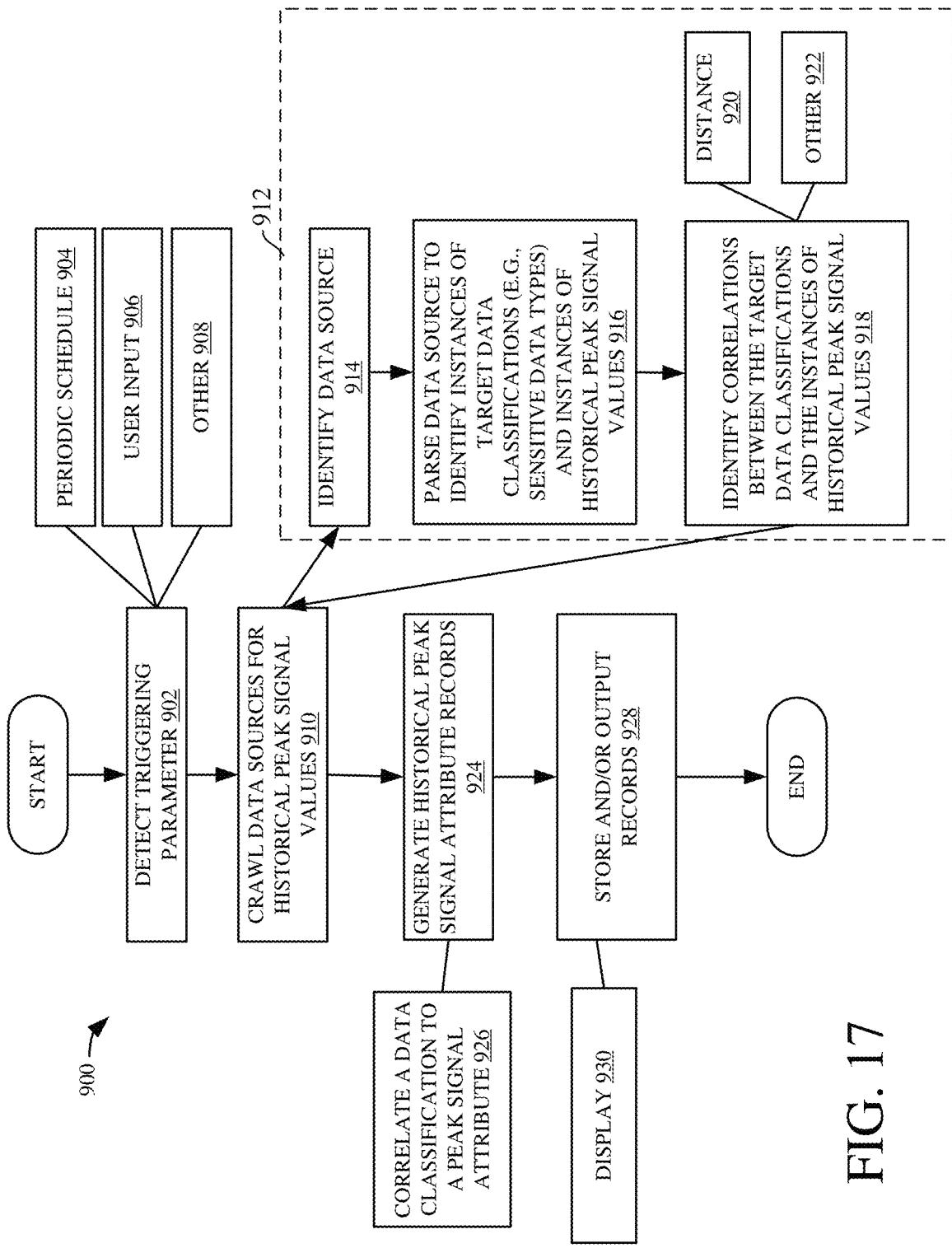
FIG. 17 is a flow diagram illustrating one example of generating historical peak signal attributes.

FIG. 17 is a flow diagram 900 illustrating one example of generating historical peak signal attributes. For sake of illustration, but not by limitation, FIG. 17 will be discussed in the context of peak signal component 230 discussed above with respect to FIG. 16.

At block 902, a triggering parameter is detected. For example, the triggering parameter can include occurrence of a periodic schedule, such as the beginning of a month, a quarter, and/or an interval (every twenty-four hours, etc.). In another example, the triggering parameter can include a user input at block 906, that request initiation of historical peak signal attribute generation. Of course, other triggering parameters can be detected as well, as represented at block 908.

At block 910, in response to the triggering parameter, one or more data sources are crawled for historical peak signal values. For example, a plurality of data corpora 124 are crawled. Block 912 illustrates one example operation for crawling a given data source.

As illustrated, at block 914, the data source is identified and, at block 916, data source crawler 812 parses the data source to identify instances of target data classifications (e.g., sensitive data types) and instances of peak signal values. For example, a text document such as a news article is parsed by crawler 812 to identify words, phrases, sentences, paragraphs, etc. and, within those structures, characters that indicate instances of the sensitive data types, as well as instances of peak signal values.

At block 918, generator 814 identifies correlations between the identified instances of the target data classifications and the identified instances of the peak signal values. For example, the correlations can be identified based on a distance between a given target data classification and a given peak signal value, as represented at block 920. For example, if an instance of a sensitive data type occurs within a proximity (a number of words) as a peak signal value, then generator 814 can determine that a correlation exists and can tag those portions of the data source accordingly. Of course, correlations can be identified in other ways as well, as represented at block 922.

At block 924, historical peak signal attribute records are generated based on the correlations identified at block 918. For example, a historical peak signal attribute record correlates a data classification to a peak signal attribute, as represented at block 926.

At block 928, the records can be stored and/or output, such as by rendering a display at block 930.

Figure 18:
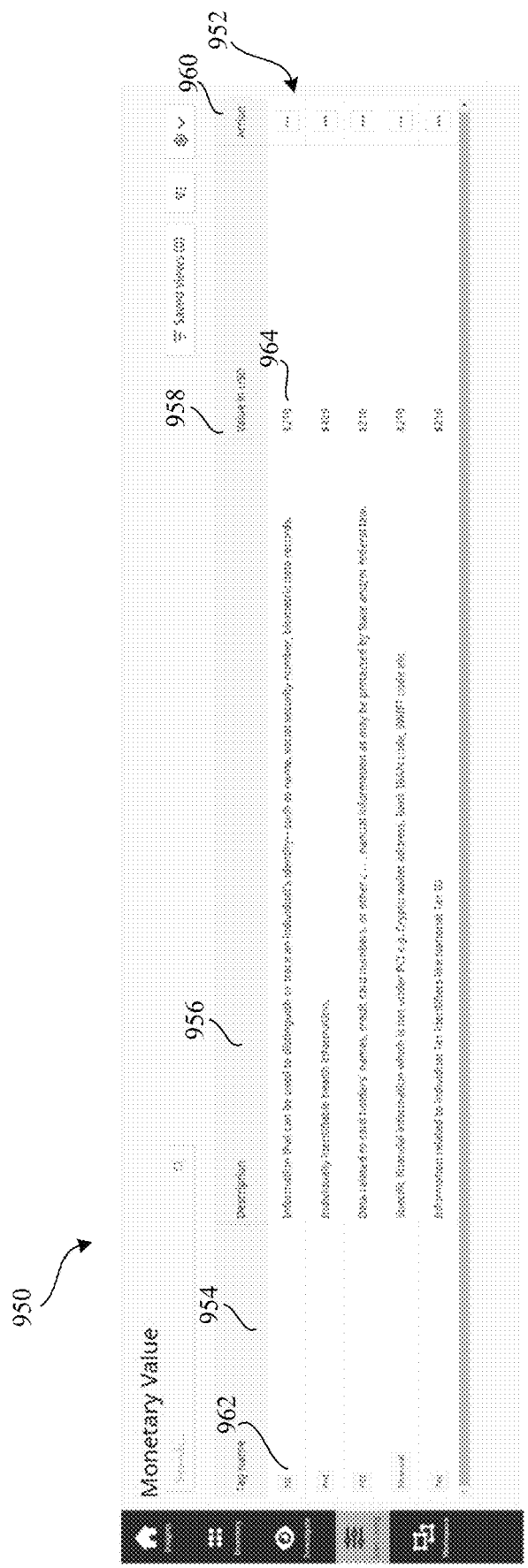
FIG. 18 illustrates one example of a user interface display that renders historical peak signal attribute records.
Figures 1, 19:
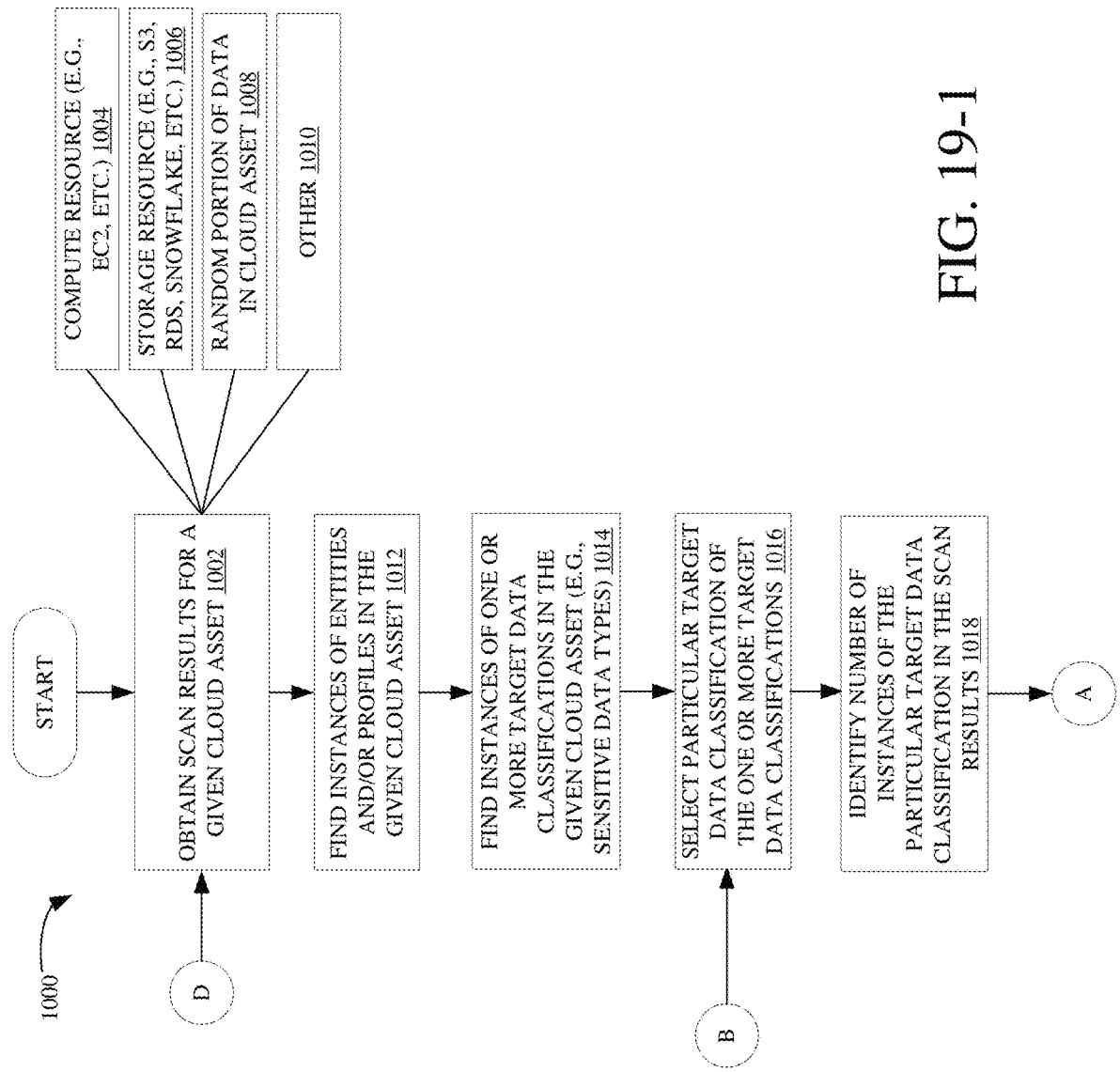
Figures 2, 19:
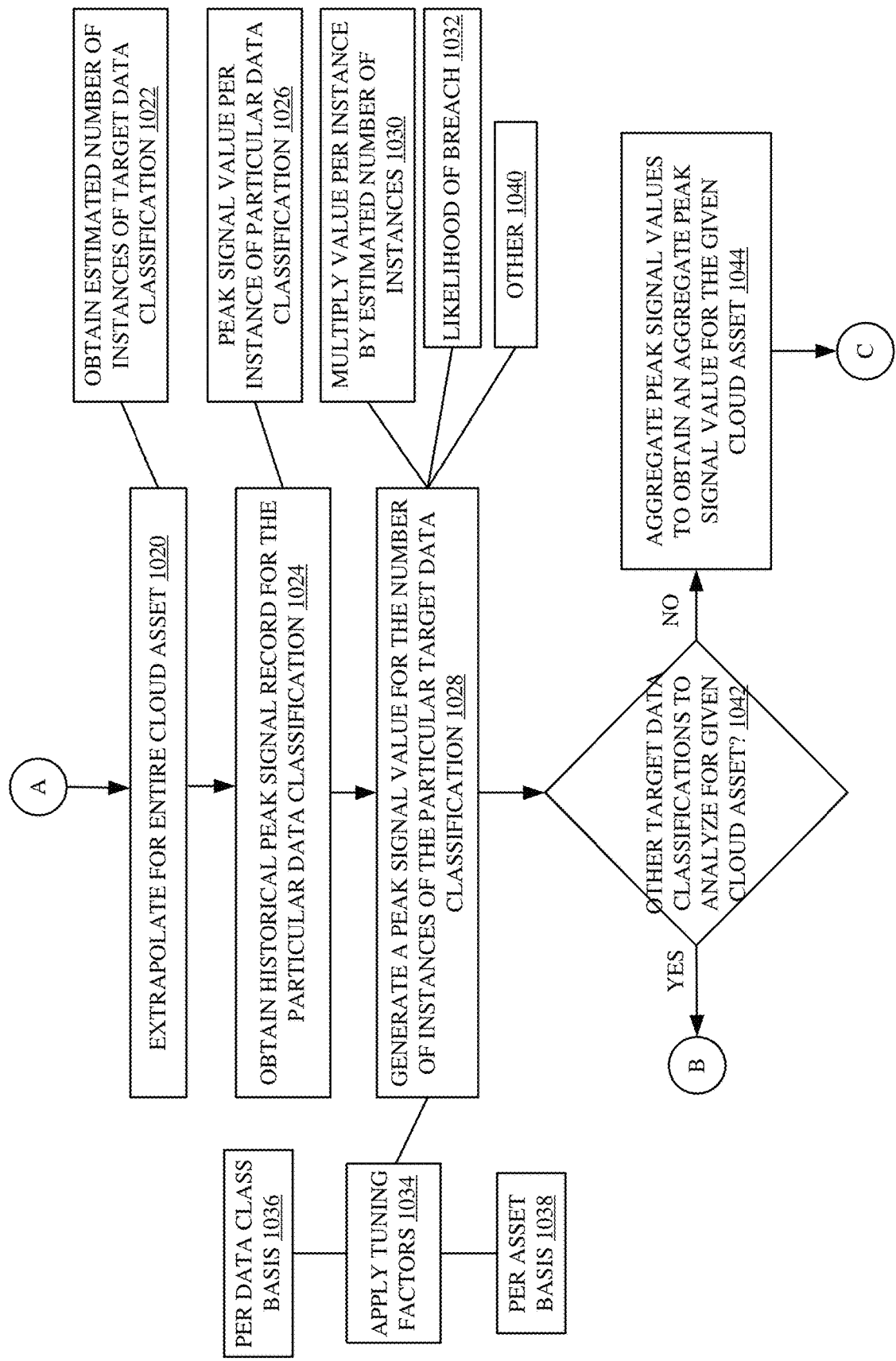
Figures 3, 19:
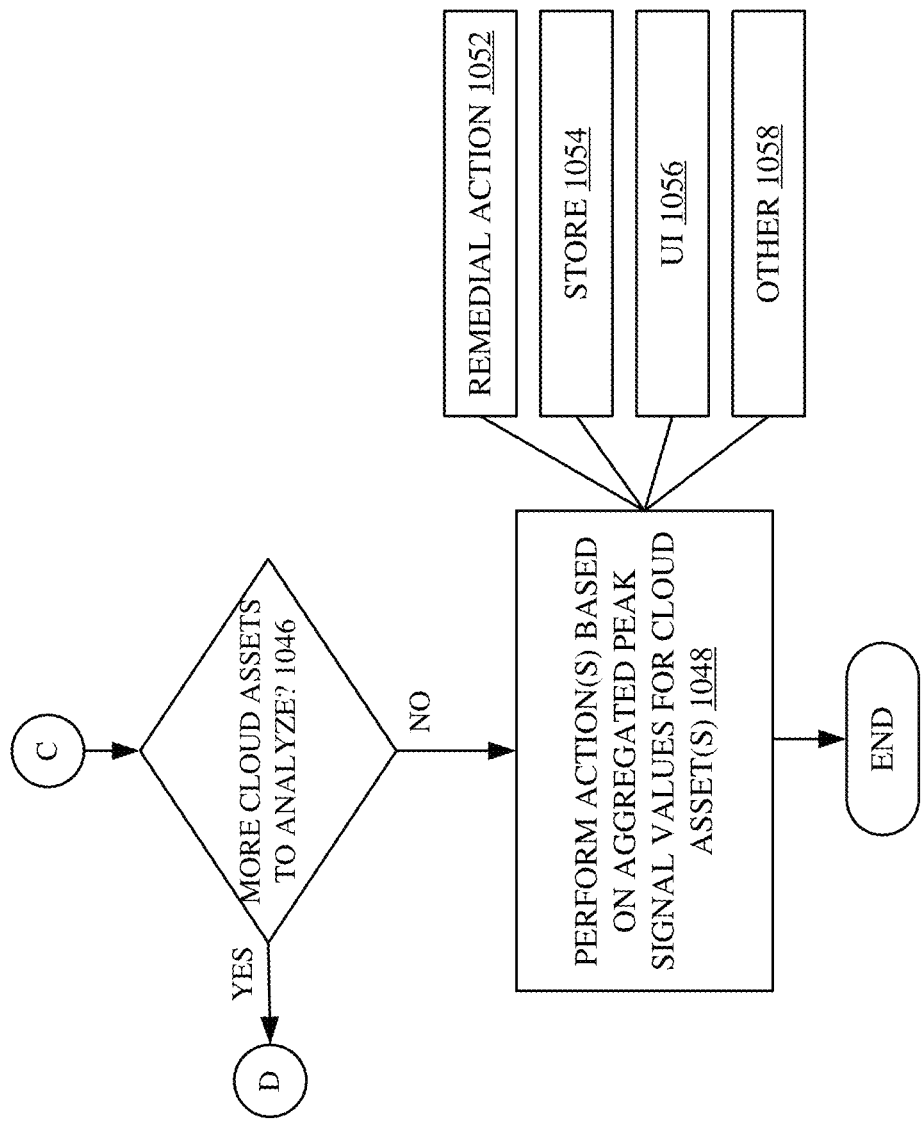

FIG. 18 illustrates one example of a user interface display 950 that renders historical peak signal attribute records. Display 950 can include user input mechanisms that allow a user to modify, add, and/or delete the sensitive data types.

As shown in FIG. 18, a plurality of rows 952 are displayed, where each row represents details of a given historical peak signal attribute record. Each row includes a tag name field 954, a description field 956, a peak signal value field 958, and can include an action mechanism 960. Of course, other fields can be displayed as well.

Tag name field 954 identifies a tag name for the attribute record represented by the row. In the illustrated example, record 962 includes a tag name "PII" (personally identifiable information) and the description field states that the personally identifiable information data classification includes information that can be used to distinguish or trace an individual's identity, such as a user's name, social security number, biometric data records, etc. The record 962 also includes a display element 964 that identifies the peak signal value for the PII data classification. Thus, record or entry 962 indicates that instances of a PII data classification are to be assigned the peak signal value represented in the peak signal value field 958 of the record.

FIGS. 19-1, 19-2, and 19-3 (collectively referred to as FIG. 19) provide a flow diagram 1000 illustrating an example operation of detecting peak signal values for cloud assets and performing actions based on those signal values.

At block 1002, scan results are obtained for a given cloud asset of a plurality of cloud assets to be analyzed. For example, the scan results obtained at block 1002 can include the scan results obtained at block 360 in FIG. 5.

The given cloud asset can include any of a variety of different types of cloud assets. For example, the given cloud asset can include a compute resource, a storage resource (1006) or other types of resources as well. An example compute resource includes an elastic compute resource, such as an EC2 instance. Examples of storage resources include, but are not limited to, data stores such as S3, RDS, Snowflake, etc.

In one example, the scan results obtained at block 1002 are from a randomly selected portion of data in the cloud asset, as represented at block 1008. As noted above, scanning can include randomly selecting one hundred data items from one thousand data items in the cloud asset, and scanning to generate scan results for only the one hundred data items. Of course, the scan results can be obtained in other ways as well, as represented at block 1010.

At block 1012, instances of entities and/or profiles are identified in the given cloud asset. Examples of entities and profiles are discussed above. Briefly, however, the entities and profiles can include predefined data structures or combinations of data structures discovered in the cloud asset.

At block 1014, instances of one or more target data classifications are identified in the given cloud asset. For example, the target data classifications can include sensitive data types, such as those illustrated above in FIG. 18. The sensitive data types can include personally identifiable information (PII), protected health information (PHI), payment card information (PCI), financial information, tax information, or other types of sensitive data types.

At block 1016, a particular target data classification is selected from the one or more target data classifications. For example, if instances of a first sensitive data type (e.g., PII data) and instances of a second sensitive data type (e.g., PHI data), block 1016 can select the first sensitive data type to analyze.

At block 1018, a number of instances of the selected particular target data classification are identified in the scanned results. For instance, for the first selected sensitive data type (PII data in the above example), block 1018 identifies a number of times that PII data occurs in the scanned results for the given cloud asset.

At block 1020, an estimated number of total instances can be extrapolated for the given cloud asset, based on the number of instances identified in the portion of data in the cloud asset that were scanned. As represented at block 1022, the estimated number of instances of the target data classification are obtained based on this extrapolation. Thus, an estimated number of instances of a sensitive data type can be determined with scanning only a portion of the cloud asset.

At block 1024, a historical peak signal record for the particular data classification is obtained. The record can include a peak signal value per instance of the particular data classification, as represented at block 1026. For sake of illustration, with reference to FIG. 18, assume that the particular data classification includes PII data, represented by entry 962. In this example, the peak signal value per instance includes the value represented by display element 964.

At block 1028, a peak signal value is generated for the number of instances of the particular target data classification in the given cloud asset. In one example, generating the peak signal value includes multiplying the peak signal value per instance by the estimated number of instances in the cloud asset (block 1030). Alternatively, or in addition, the peak signal value can be generated based on a likelihood of breach determined at block 1032.

The peak signal value can also be generated by applying tuning factors, as represented at block 1034. An example tuning factor determines a weight to apply to the value per instance when generating the peak signal value. Tuning factors can be defined on a per data classification basis (block 1036) and/or on a per asset basis (block 1038). For example, a tuning factor can indicate that a peak signal value attribute should be increased or decreased for a given sensitive data type. To illustrate, a peak signal value for a PII data type can be increased by a certain percentage for a given cloud asset. Alternatively, or in addition, a tuning factor can indicate that PII data is to be considered in generating a peak signal for a first data store, but not considered in generating a peak signal value for a second data store. Also, a user can determine that a particular data classification does not apply to the user's organization, for example given the organization's structure (size, location, etc.). Accordingly, the tuning factors allow for user in the loop feedback and adjustment to customizes peak signal value detection. Of course, the peak signal values can be generated in other ways as well, as represented at block 1040.

At block 1042, it is determined whether there are other target data classifications (other sensitive data types) to analyze for the given cloud asset. If so, operation returns to block 1016 where another target data classification is selected to generate a peak signal value for the given cloud asset.

If there are no other target data classifications to analyze for the given cloud asset, operation proceeds to block 1044 in which the peak signal values (generated for the different target data classifications) are aggregated to obtain an aggregate peak signal value for the given cloud asset. For example, a first peak signal value obtained for PII data can be added to a second peak signal value obtained for PHI data to obtain the aggregate peak signal value.

At block 1046, it is determined whether additional cloud assets are to be analyzed. If so, operation returns to block 1002 in which scanned results are obtained for another cloud asset.

If there are no additional cloud assets to analyze, operation proceeds to block 1048 in which one or more actions can be performed based on the aggregated peak signal values for the cloud assets. The actions can include, but are not limited to, performing a remedial action at block 1052, storing the aggregated peak signal values at block 1054, generating a user interface to render an indication of the aggregated peak signal values at block 1056, or other actions at block 1058.

Figure 20:
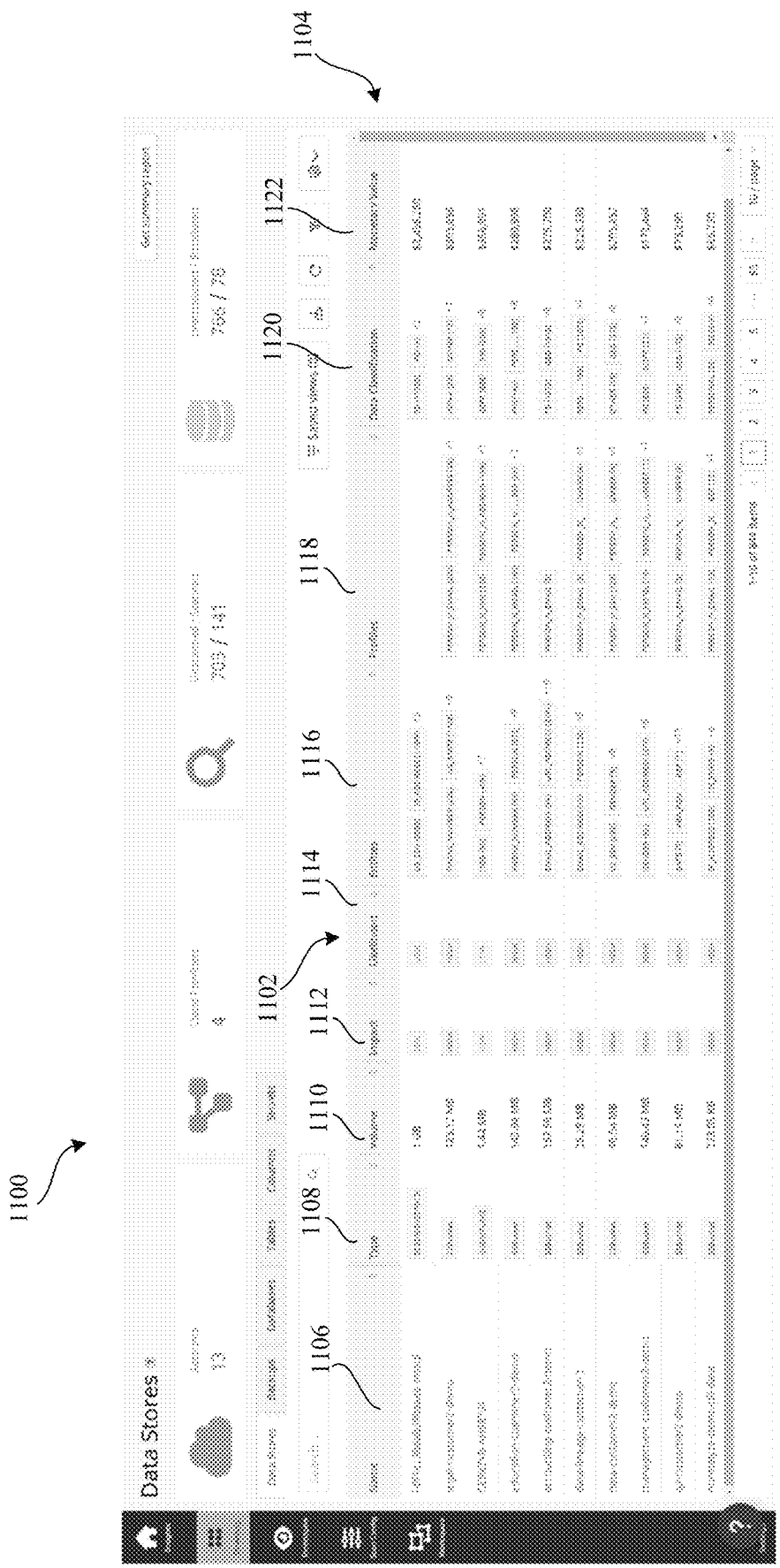
FIG. 20 illustrates one example of a user interface display.

FIG. 20 illustrates one example of a user interface display 1100 that can be generated at block 1056. Display 1100 includes a list 1102 of entries as rows in a table. Each entry or row 1104 represents a particular cloud asset (i.e., a particular data store in the example of FIG. 20). Each row includes a name field 1106, a type field 1108, a volume field 1110, an impact field 1112, a likelihood field 1114, an entities field 1116, a profiles field 1118, a data classification field 1120, and a peak signal value field 1122.

The name field 1106 displays a name of the data store represented by the entry and the type field 1108 indicates a type of the data store. Volume field 1110 indicates the storage volume of the data store and the impact field 1112 and likelihood field 1114 indicate impact and likelihood scores for potential breaches. Entities field 1116 indicates the entities that are identified in the particular data store and the profiles field 1118 identifies the profiles that are identified in the given data store. Data classification field 1120 indicates the different data classifications that are identified in the data store, alone with a numerical indicator of the number of instances of each identified data classification. Peak signal value field 1122 indicates the aggregated peak signal values based on each the instances of the data classifications represented in field 1120.

Figure 21:
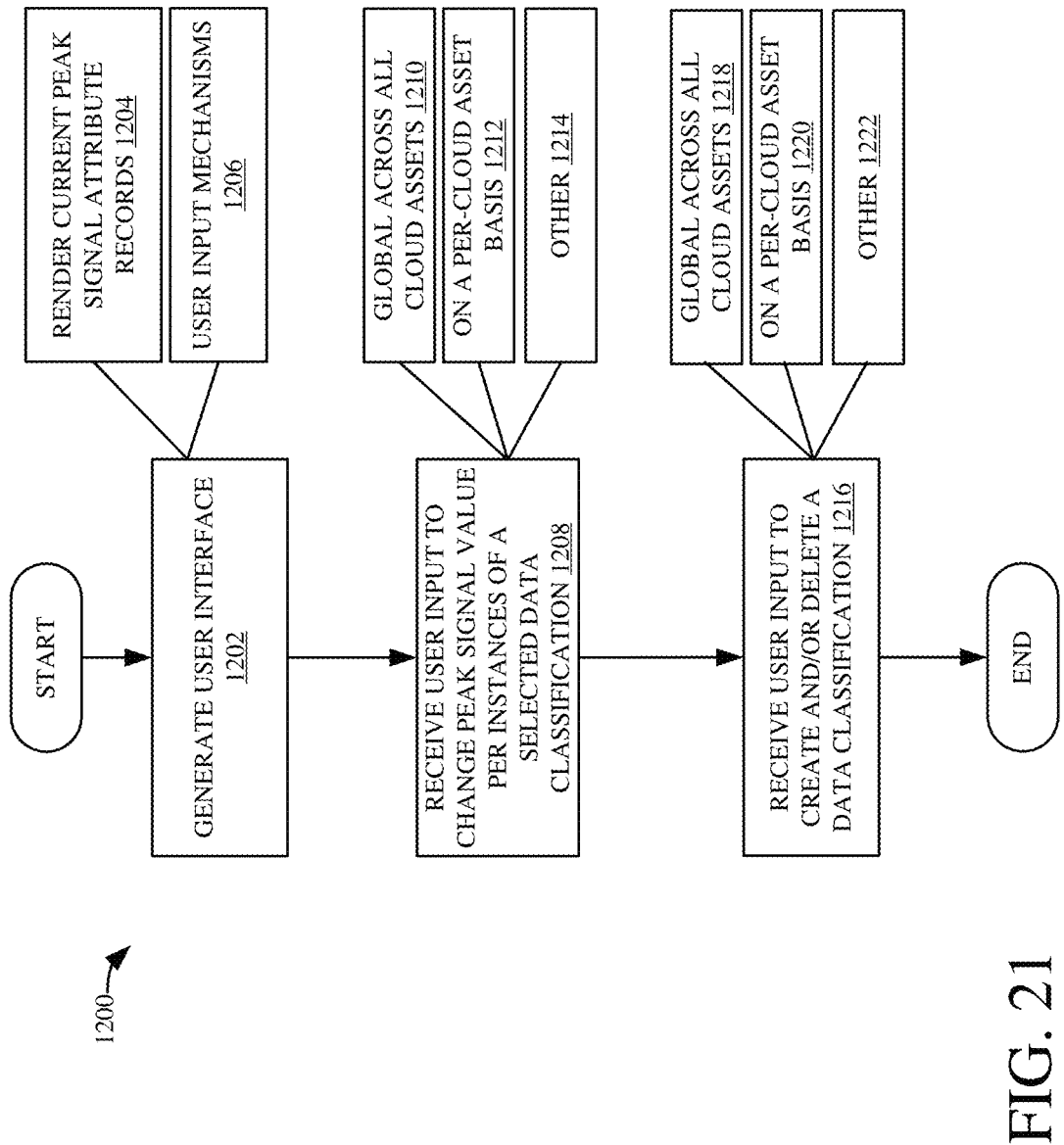
FIG. 21 provides a flow diagram illustrating an example operation of generating tuning factors.
Figure 22:
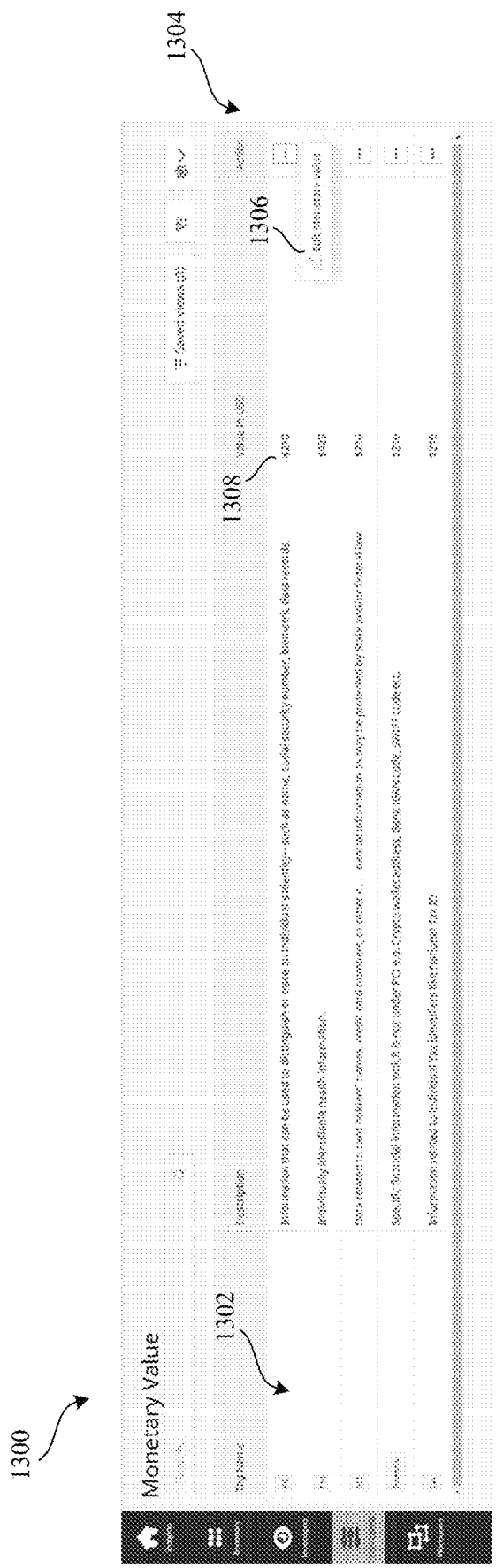
FIG. 22 illustrates one example of a user interface.

FIG. 21 provides a flow diagram 1200 illustrating an example operation of generating tuning factors. At block 1202, a user interface is generated that can render currently defined peak signal attribute records (block 1204), along with user input mechanisms (block 1206). FIG. 22 illustrates one example of a user interface 1300. A plurality of entries 1302 represent the peak signal attribute records and user input mechanisms 1304 allow a user to edit, add, or remove tuning factors.

Referring again to FIG. 21, user input is received at block 1208 to change a peak signal value per instance of a selected data classification. For example, the change can be global across all cloud assets (as represented at block 1210), on a per-cloud asset basis (block 1212) or otherwise (block 1214). At block 1216, a user input to created and/or delete a data classification is received. Again, the changes can include global changes at block 1218, per-asset changes at block 1220, or other changes at block 1222.

Referring to FIG. 22, user interface display 1300 includes a user input mechanism 1306 that is actuatable to edit the peak signal value attribute in field 1308. For example, a user can change the weight that instances of PII data used to generate the peak signal value for one or more cloud assets.

Figures 1, 23:
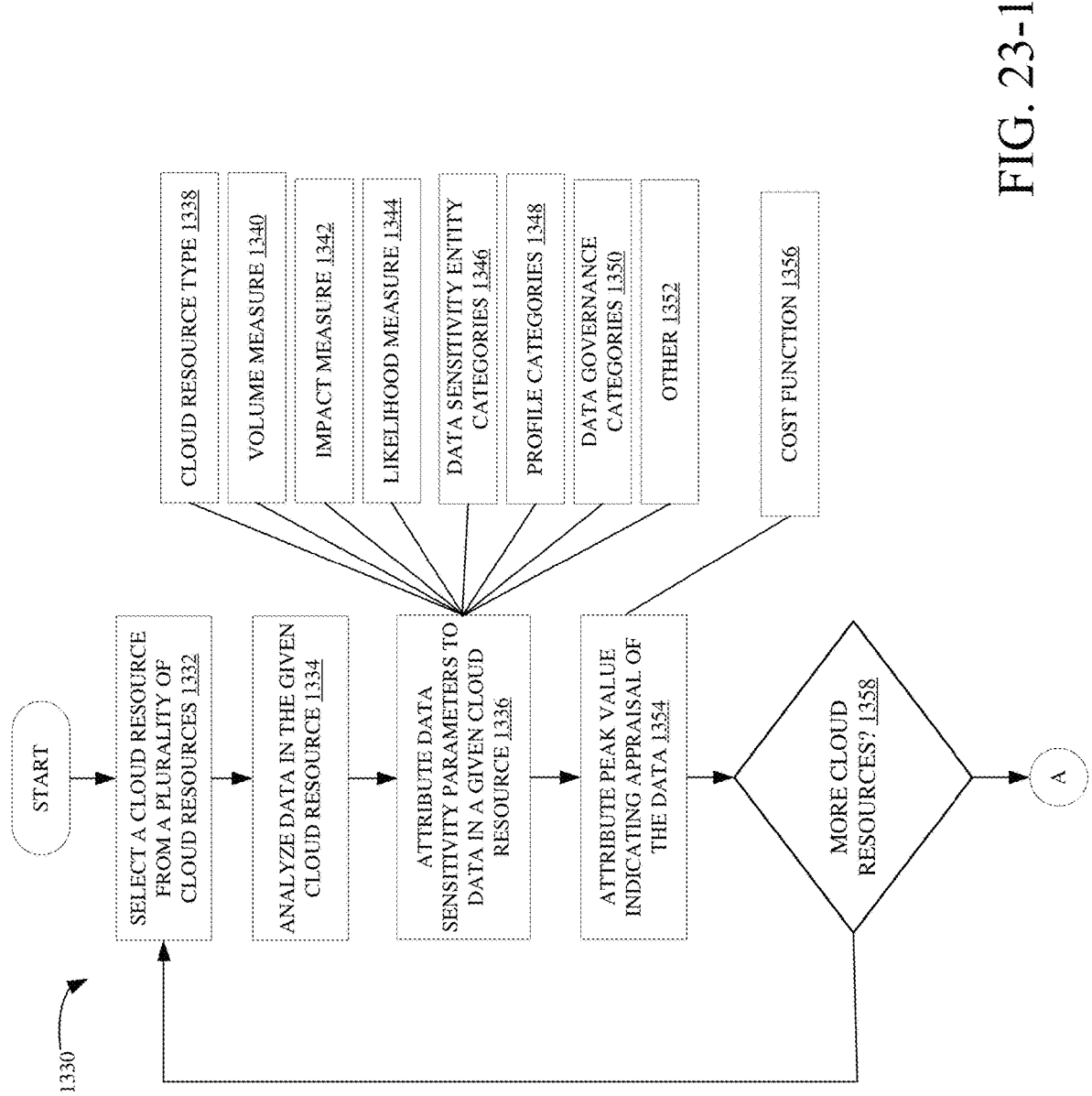
Figures 2, 23:
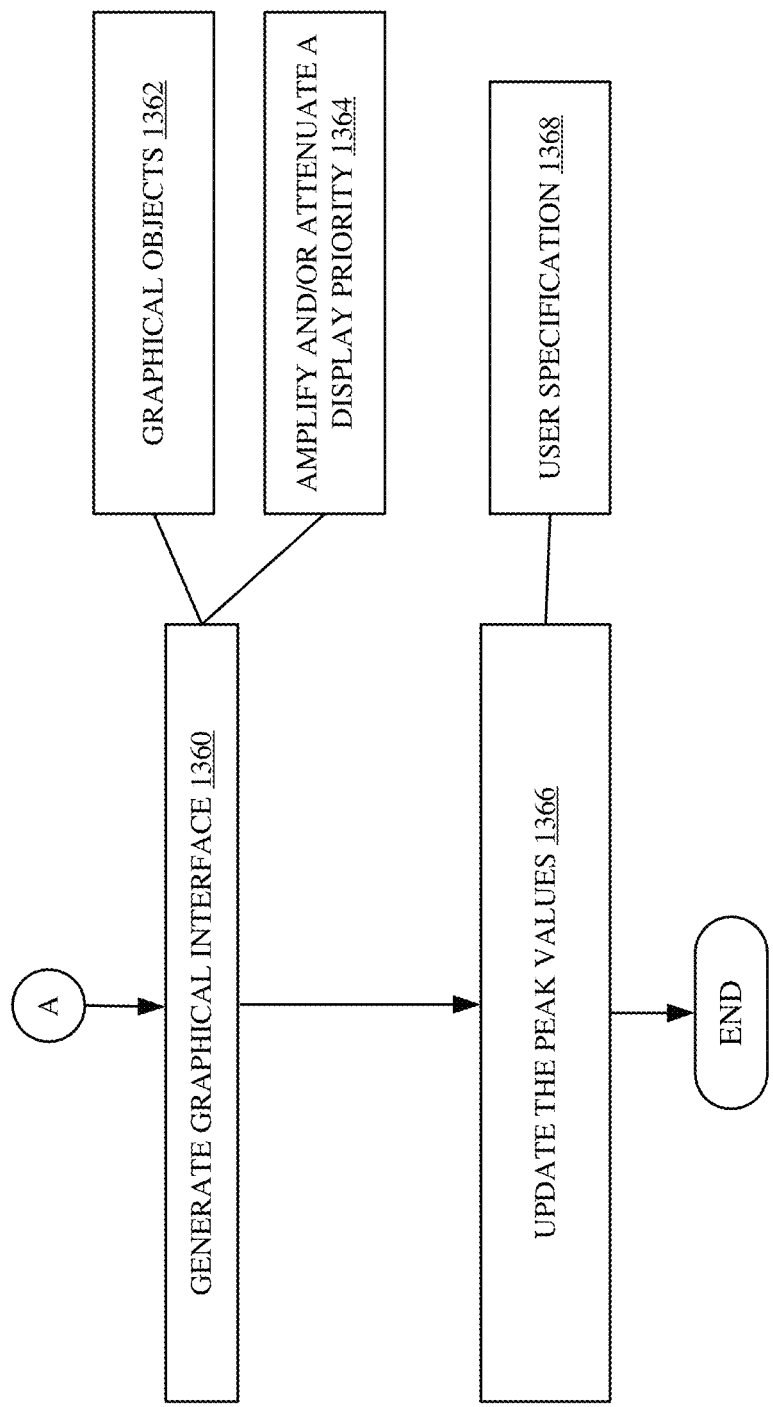

FIG. 23 provides a flow diagram 1330 illustrating an example operation for prioritized presentation of high-value cloud resources susceptible to cloud security risks. For sake of illustration, but not by limitation, FIG. 23 will be discussed in the context of posture analysis system 112 and peak signal component 230, illustrated with respect to FIGS. 3 and 16.

At block 1332, a cloud resource is selected from a plurality of cloud resources. Thus, the analysis can be performed on a cloud resource-by-cloud resource basis. The resources can include, but are not limited to, storage resources, compute resources, and/or other types of resources.

At block 1334, data is analyzed in the given cloud source selected from the plurality of cloud resources. A plurality of data sensitivity parameters are attributed to the data in the given cloud resource at block 1336. For example, the plurality of data sensitivity parameters can include a cloud resource type (block 1338), a volume measure (block 1340), an impact measure (block 1342), a likelihood measure (block 1344), a data sensitivity entity category (block 1346), a profile category (block 1348), a data governance category (block 1350), and can include other parameters (block 1352) as well.

A cloud resource type parameter indicates a resource type of the given cloud resource. A volume measure parameter indicates a measure of the volume of data in the given cloud resource. An impact measure indicates an impact of a potential breach of data in the given cloud resource. A likelihood measure indicates a likelihood of the potential breach of the data. A data sensitivity entity category can indicate a category into which sensitive data entities are placed, from the data in the given data resource. For example, block 1336 can include identifying a count of a number of instances of the data sensitivity entities in the data store.

A data sensitivity profile category indicates matching instances of the predefined sensitivity profiles, that occur in the given cloud resource. In one example, block 1336 can include identifying a count of a number of instances of the profiles. In one example, a profile can include a data governance rule.

At block 1354, a peak value is attributed to the cloud resource indicating an appraisal of the data, based on the data sensitivity parameters. Examples of generating peak values are discussed above.

In one example, block 1354 can include applying a cost function at block 1356. In one example, the cost function determines the peak value by taking into account one or more data sensitivity parameters in the plurality of data sensitivity parameters attributed at block 1336. In one example, the cost function is weighted by one or more of the data sensitivity parameters. The cost function can determine respective peak values for respective data sensitivity parameters, in the plurality of data sensitivity parameters, and sum the respective peak value to generate or accumulate the peak value. For example, the sum can include a weighted sum, that is weighted based on applying the cost function weights to the sensitivity parameters.

Alternatively, or in addition, the cost function can determine the peak value by taking into account costs associated with the plurality of data sensitivity parameters. For example, the costs can include, but are not limited to, data breach costs, data acquisition costs, data management costs, data processing costs, to name a few. In one example, these costs can be identified based on the historical peak signal attribute records that are generated by crawling the data sources, as discussed above.

At block 1358, the operation determines whether there are more cloud resources to selected and analyze. If so, the operation returns to block 1332.

At block 1360, a graphical interface is generated and includes graphical objects (represented at block 1362) configured to display each given cloud resource, and, for the given cloud resource, the plurality of data sensitivity parameters attributed at block 1336 and the peak value attributed at block 1354. The graphical interface is configured to amplify and/or attenuate a display priority of the cloud resources based upon the corresponding peak values for those cloud resources, as represented at block 1364.

In one example, the graphical interface is configured to amplify the display priority of the cloud resources that have higher peak values over those cloud resources that have lower peak values. Alternatively, or in addition, the graphical interface is configured to attenuate the display priority of those cloud resources that have lower peak values over those cloud resources that have higher peak values.

Also, an order of display of the cloud resources in the graphical interface can be dependent upon the corresponding peak values. For example, the graphical objects in the graphical interface can have a display order, that displays the cloud resources in a descending order in dependence upon decreasing peak values.

Examples of the graphical interface are discussed above with respect to FIGS. 18, 20, and 22.

At block 1366, the peak values can be updated based on an input or feedback. For example, the peak values can be updated in response to user specification, at block 1368. The user specification can be received from the graphical user interface.

For example, update logic 827 is configured to update the corresponding peak values, corresponding to the cloud resources, in response to user input through the graphical interface. In one example, the graphical interface is configured to amplify and/or attenuate the display priority based upon the updated corresponding peak values, that are updated in response to the user specification.

The peak values, in one example, are updated by updating the corresponding cost functions based on the user specification. The user specification can update the corresponding cost functions by updating the plurality of data sensitivity parameters on a cloud resource-by-cloud resource basis. For example, a user can select one or more specific cloud resources, to change or update some or all of the data sensitivity parameters for those cloud resources. The user specification can also update the corresponding cost functions and corresponding peak values at an organization-wide level. In one example, some or all of the cloud resources of the organization associated with the user can have the updated cost functions applied to update the peak values for the organization's resources.

It can thus be seen that the present disclosure describes technology for security posture analysis of a cloud account. In some described examples, the technology can discover sensitive data among the cloud storage resources and detect peak signals using local scanners that reduce or eliminate need to send the cloud data outside the cloud environment. This improves data security. Further, the technology facilitates the discover of security vulnerabilities to understand the data security posture, detect, and remediate the security vulnerabilities, and to prevent future breaches to sensitive data. The system provides real-time visibility and control on the control data infrastructure by discovering resources, sensitive data, and access paths, and tracking resource configuration, deep context, and trust relationships in real-time as a graph or other visualization.

One or more implementations of the technology disclosed or elements thereof can be implemented in the form of a computer product, including a non-transitory computer readable storage medium with computer usable program code for performing the method steps indicated. Furthermore, one or more implementations and clauses of the technology disclosed or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

Examples discussed herein include processor(s) and/or server(s). For sake of illustration, but not by limitation, the processors and/or servers include computer processors with associated memory and timing circuitry, and are functional parts of the corresponding systems or devices, and facilitate the functionality of the other components or items in those systems.

Also, user interface displays have been discussed. Examples of user interface displays can take a wide variety of forms with different user actuatable input mechanisms. For instance, a user input mechanism can include icons, links, menus, text boxes, check boxes, etc., and can be actuated in a wide variety of different ways. Examples of input devices for actuating the input mechanisms include, but are not limited to, hardware devices (e.g., point and click devices, hardware buttons, switches, a joystick or keyboard, thumb switches or thumb pads, etc.) and virtual devices (e.g., virtual keyboards or other virtual actuators). For instance, a user actuatable input mechanism can be actuated using a touch gesture on a touch sensitive screen. In another example, a user actuatable input mechanism can be actuated using a speech command.

The present figures show a number of blocks with corresponding functionality described herein. It is noted that fewer blocks can be used, such that functionality is performed by fewer components. Also, more blocks can be used with the functionality distributed among more components. Further, the data stores discussed herein can be broken into multiple data stores. All of the data stores can be local to the systems accessing the data stores, all of the data stores can be remote, or some data stores can be local while others can be remote.

The above discussion has described a variety of different systems, components, logic, and interactions. One or more of these systems, components, logic and/or interactions can be implemented by hardware, such as processors, memory, or other processing components. Some particular examples include, but are not limited to, artificial intelligence components, such as neural networks, that perform the functions associated with those systems, components, logic, and/or interactions. In addition, the systems, components, logic and/or interactions can be implemented by software that is loaded into a memory and is executed by a processor, server, or other computing component, as described below. The systems, components, logic and/or interactions can also be implemented by different combinations of hardware, software, firmware, etc., some examples of which are described below. These are some examples of different structures that can be used to implement any or all of the systems, components, logic, and/or interactions described above.

The elements of the described figures, or portions of the elements, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 24:
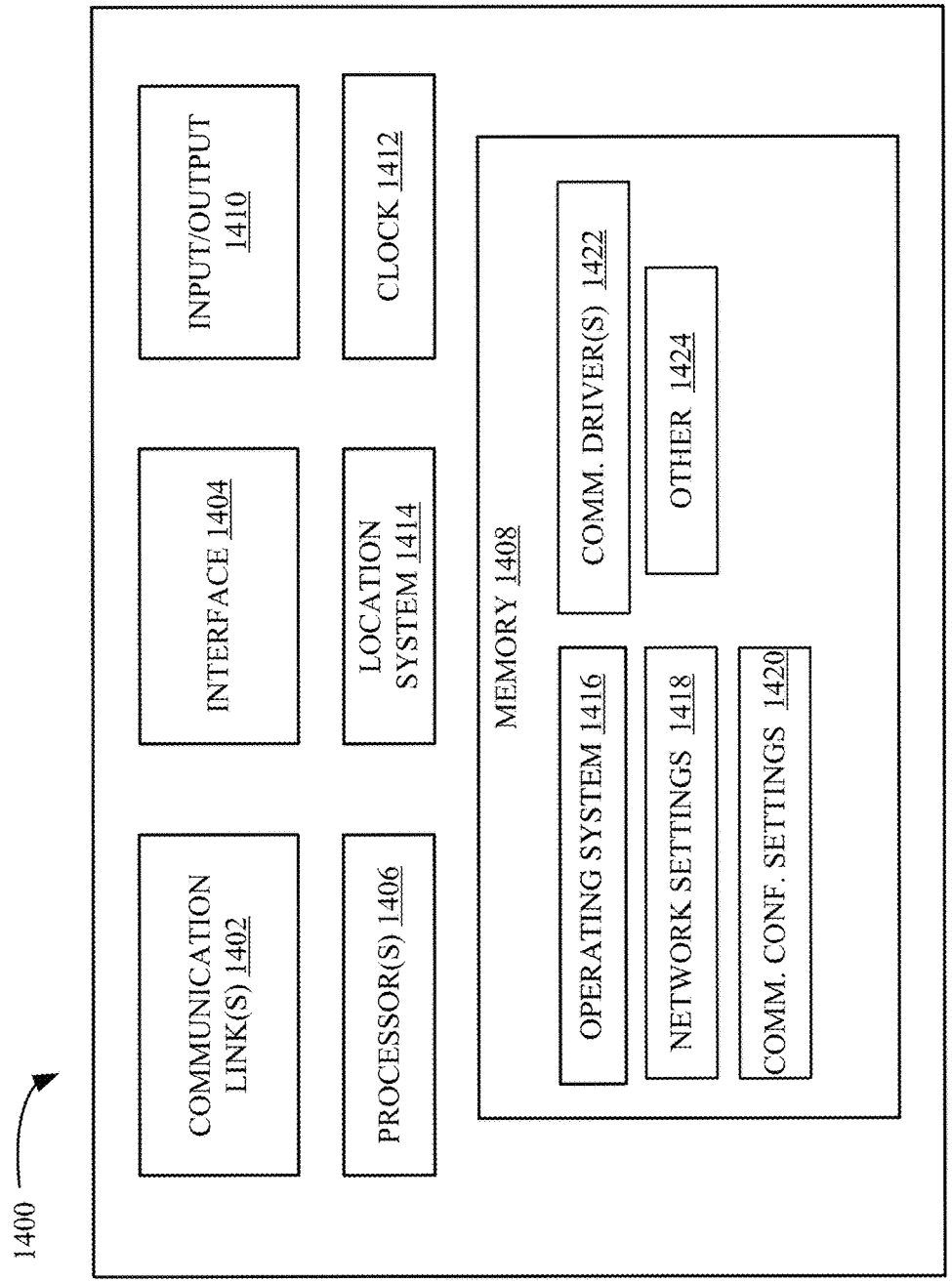
FIG. 24 is a simplified block diagram of one example of a client device.

FIG. 24 is a simplified block diagram of one example of a client device 1400, such as a handheld or mobile device, in which the present system (or parts of the present system) can be deployed. FIG. 33 illustrates an example of a handheld or mobile device.

One or more communication links 1402 allows device 1400 to communicate with other computing devices, and can provide a channel for receiving information automatically, such as by scanning. An example includes communication protocols, such as wireless services used to provide cellular access to a network, as well as protocols that provide local wireless connections to networks.

Applications or other data can be received on an external (e.g., removable) storage device or memory that is connected to an interface 1404. Interface 1404 and communication links 1402 communicate with one or more processors 1406 (which can include processors or servers described with respect to the figures) along a communication bus (not shown in FIG. 24), that can also be connected to memory 1408 and input/output (I/O) components 1410, as well as clock 1412 and a location system 1414.

Components 1410 facilitate input and output operations for device 1400, and can include input components such as microphones, touch screens, buttons, touch sensors, optical sensors, proximity sensors, orientation sensors, accelerometers. Components 1410 can include output components such as a display device, a speaker, and or a printer port.

Clock 1412 includes, in one example, a real time clock component that outputs a time and date, and can provide timing functions for processor 1406. Location system 1414 outputs a current geographic location of device 1400 and can includes a global positioning system (GPS) receiver, a LORAN system, a dead reckoning system, a cellular triangulation system, or other positioning system. Memory 1408 stores an operating system 1416, network applications and corresponding configuration settings 1418, communication configuration settings 1420, communication drivers 1422, and can include other items 1424. Examples of memory 1408 include types of tangible volatile and non-volatile computer-readable memory devices. Memory 1408 can also include computer storage media that stores computer readable instructions that, when executed by processor 1406, cause the processor to perform computer-implemented steps or functions according to the instructions. Processor 1406 can be activated by other components to facilitate functionality of those components as well.

Figure 25:
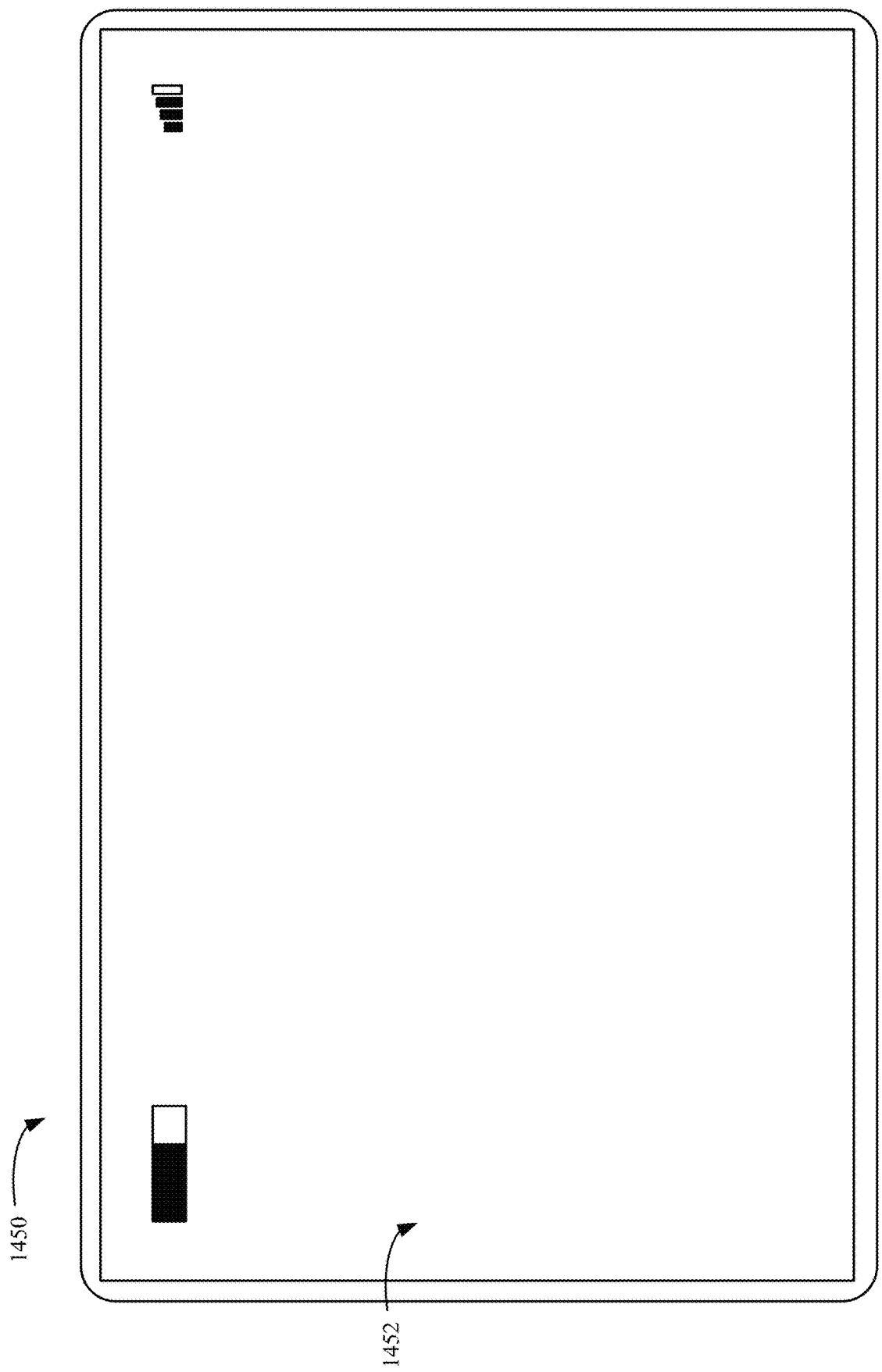
FIG. 25 illustrates an example of a handheld or mobile device.

FIG. 25 illustrates one example of a tablet computer 1450 having a display screen 1452, such as a touch screen or a stylus or pen-enabled interface. Screen 1452 can also provide a virtual keyboard and/or can be attached to a keyboard or other user input device through a mechanism, such as a wired or wireless link. Alternatively, or in addition, computer 1450 can receive voice inputs.

Figure 26:
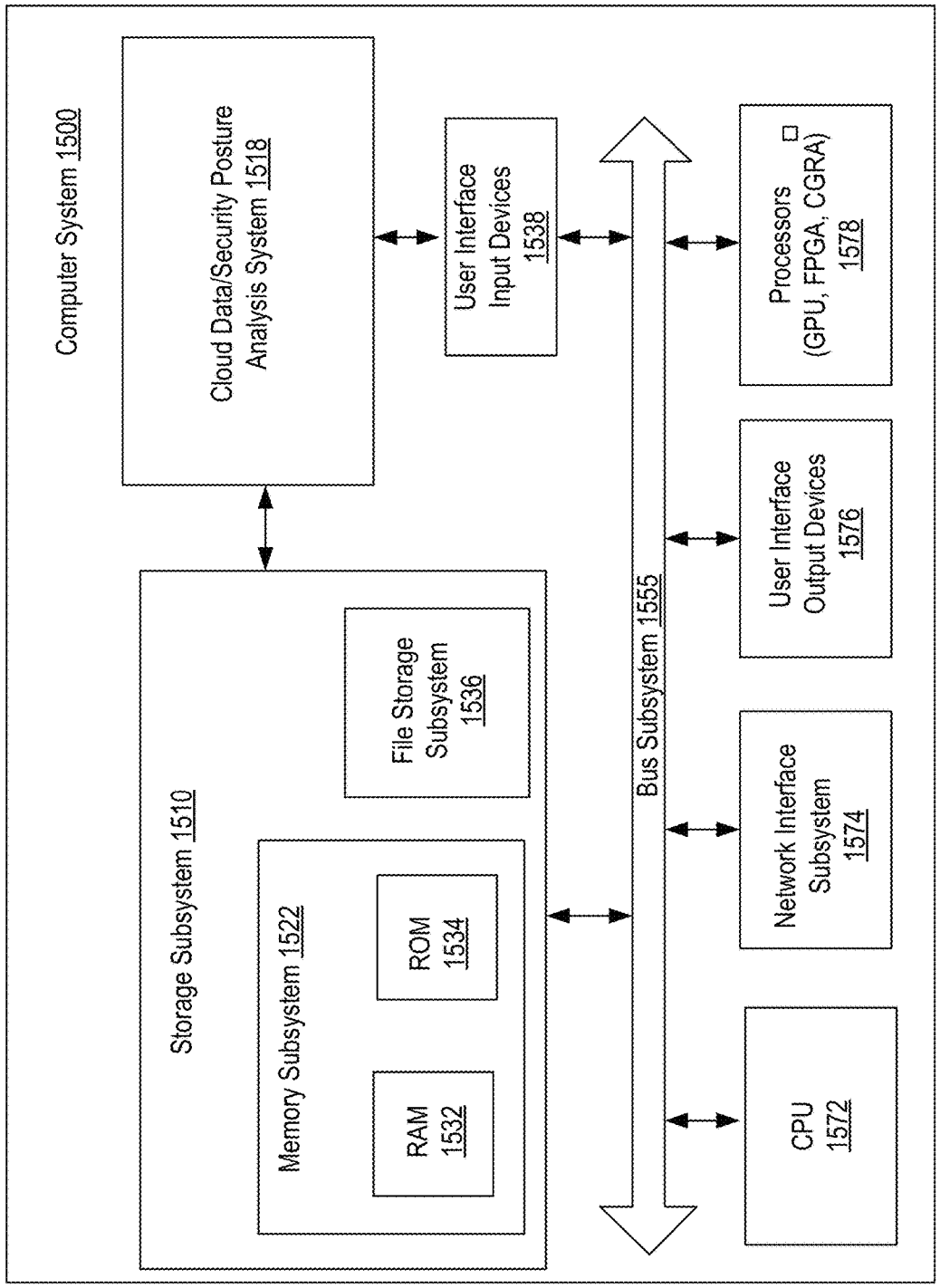
FIG. 26 shows an example computer system.

FIG. 26 shows an example computer system 1500 that can be used to implement the technology disclosed. Computer system 1500 includes at least one central processing unit (CPU) 1572 that communicates with a number of peripheral devices via bus subsystem 1555. These peripheral devices can include a storage subsystem 1510 including, for example, memory devices and a file storage subsystem 1536, user interface input devices 1538, user interface output devices 1576, and a network interface subsystem 1574. The input and output devices allow user interaction with computer system 1500. Network interface subsystem 1574 provides an interface to outside networks, including an interface to corresponding interface devices in other computer systems.

In one implementation, cloud data/security posture analysis system 1518 is communicably linked to the storage subsystem 1510 and the user interface input devices 1538.

User interface input devices 1538 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1500.

User interface output devices 1576 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1500 to the user or to another machine or computer system.

Storage subsystem 1510 stores programming and data constructs that provide the functionality of some or all of the modules and methods described herein. These software modules are generally executed by processors 1578.

Processors 1578 can be graphics processing units (GPUs), field-programmable gate arrays (FPGAs), application-specific integrated circuits (ASICs), and/or coarse-grained reconfigurable architectures (CGRAs). Processors 1578 can be hosted by a deep learning cloud platform such as Google Cloud Platform™, Xilinx™, and Cirrascale™. Examples of processors 1578 include Google's Tensor Processing Unit (TPU)™, rackmount solutions like GX4 Rackmount Series™, GX50 Rackmount Series™, NVIDIA DGX-1™, Microsoft™ Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100s™, and others.

Memory subsystem 1522 used in the storage subsystem 1510 can include a number of memories including a main random access memory (RAM) 1532 for storage of instructions and data during program execution and a read only memory (ROM) 1534 in which fixed instructions are stored. A file storage subsystem 1536 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1536 in the storage subsystem 1510, or in other machines accessible by the processor.

Bus subsystem 1555 provides a mechanism for letting the various components and subsystems of computer system 1500 communicate with each other as intended. Although bus subsystem 1555 is shown schematically as a single bus, alternative implementations of the bus subsystem can use multiple busses.

Computer system 1500 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1500 depicted in FIG. 26 is intended only as a specific example for purposes of illustrating the preferred implementations of the present invention. Many other configurations of computer system 1500 are possible having more or less components than the computer system depicted in FIG. 26.

It should also be noted that the different examples described herein can be combined in different ways. That is, parts of one or more examples can be combined with parts of one or more other examples. All of this is contemplated herein.

The technology disclosed can be practiced as a system, method, or article of manufacture. One or more features of an implementation can be combined with the base implementation. Implementations that are not mutually exclusive are taught to be combinable.

One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for prioritized presentation of high value cloud resources susceptible to cloud security risks, the system comprising:
   a processor, including memory accessible by the processor, the memory including instructions executable to:
      on a cloud resource-by-cloud resource basis, analyze data in a given cloud resource, and attribute to the given cloud resource:
         a plurality of data sensitivity parameters to the data in the given cloud resource, and
         a given peak value indicating an appraisal of the data in the given cloud resource, wherein
            the given peak value is determined by a cost function that takes into account one or more data sensitivity parameters in the plurality of data sensitivity parameters,
            the cost function is weighted by one or more data sensitivity parameters in the plurality of data sensitivity parameters, and
            the cost function determines respective peak values for respective data sensitivity parameters in the plurality of data sensitivity parameters, and sums the respective peak values to generate the given peak value; and
      display a graphical interface including graphical objects configured to display the given cloud resource, the plurality of data sensitivity parameters, and the given peak value; and
      wherein the graphical interface is configured to amplify and/or attenuate a display priority of the cloud resources in dependence upon corresponding peak values.

2. The system of claim 1, wherein the graphical interface is further configured to at least one of:
   amplify the display priority of those cloud resources that have higher peak values over those cloud resources that have lower peak values, or
   attenuate the display priority of those cloud resources that have lower peak values over those cloud resources that have higher peak values.

3. The system of claim 1, wherein the graphical interface is further configured to order a display of the cloud resources in at least one of:
   a descending order in dependence upon decreasing peak values, or
   an ascending order in dependence upon increasing peak values.

4. The system of claim 1, wherein the cost function generates a weighted sum of the respective peak values.

5. The system of claim 4, wherein the cost function determines the given peak value by taking into account one or more costs associated with the plurality of data sensitivity parameters.

6. The system of claim 5, wherein the one or more costs include at least one of:
   data breach costs,
   data acquisition costs,
   data management costs, or
   data processing costs.

7. The system of claim 1, wherein the plurality of data sensitivity parameters includes at least one of:
   a cloud resource type of the given cloud resource,
   a volume measure of the data in the given cloud resource, an impact measure of impact of potential breach of the data in the given cloud resource,
a likelihood measure of likelihood of potential breach of the data in the given cloud resource,
data sensitivity entity categories attributed to the data in the given cloud resource,
data sensitivity profile categories attributed to the data in the given cloud resource or
data governance categories attributed to the data in the given cloud resource.

8. The system of claim 7, wherein the plurality of data sensitivity parameters includes at least one of:
counts of the data sensitivity entity categories,
counts of the data sensitivity profile categories, or
counts of the data governance categories.

9. The system of claim 1, wherein the cloud resources comprise one or more of:
storage resources, or
compute resources.

10. The system of claim 1, further configured to comprise update logic to update, in response to user specification, the corresponding peak values to generate updated corresponding peak values.

11. The system of claim 10, wherein the graphical interface is further configured to further amplify and/or attenuate the display priority of the cloud resources in dependence upon the updated corresponding peak values.

12. The system of claim 10, wherein the memory includes instructions executable to update the corresponding peak values by updating corresponding cost functions in response to the user specification.

13. The system of claim 12, wherein the user specification updates the corresponding cost functions by updating the plurality of data sensitivity parameters on the cloud resource-by-cloud resource basis.

14. A computer-implemented method for prioritized presentation of cloud resources susceptible to cloud security risks, the method comprising:
analyzing, on a cloud resource-by-cloud resource basis, data in a given cloud resource, and attributing to the given cloud resource
a plurality of data sensitivity parameters to the data in the given cloud resource, and
a given peak value indicating an appraisal of the data in the given cloud resource, wherein
the given peak value is determined by a cost function that takes into account one or more data sensitivity parameters in the plurality of data sensitivity parameters,
the cost function is weighted by one or more data sensitivity parameters in the plurality of data sensitivity parameters, and
the cost function determines respective peak values for respective data sensitivity parameters in the plurality of data sensitivity parameters, and sums the respective peak values to generate the given peak value; and
displaying a graphical interface including graphical objects configured to display the given cloud resource, the plurality of data sensitivity parameters, and the given peak value, wherein the graphical interface is configured to amplify and/or attenuate a display priority of the cloud resources in dependence upon corresponding peak values.

15. The computer-implemented method of claim 14, wherein displaying the graphical interface comprises at least one of:

amplifying the display priority of those cloud resources that have higher peak values over those cloud resources that have lower peak values, or
attenuating the display priority of those cloud resources that have lower peak values over those cloud resources that have higher peak values.

16. The computer-implemented method of claim 14, wherein displaying the graphical interface comprises ordering a display of the cloud resources in at least one of:
a descending order in dependence upon decreasing peak values, or
an ascending order in dependence upon increasing peak values.

17. The computer-implemented method of claim 14, and further comprising determining the given peak value based on a cost function that takes into account one or more data sensitivity parameters in the plurality of data sensitivity parameters.

18. The computer-implemented method of claim 17, wherein the cost function is weighted by one or more data sensitivity parameters in the plurality of data sensitivity parameters.

19. The computer-implemented method of claim 18, wherein the cost function determines the given peak value by taking into account one or more costs associated with the plurality of data sensitivity parameters.

20. The computer-implemented method of claim 19, wherein the one or more costs include at least one of:
data breach costs,
data acquisition costs,
data management costs, or
data processing costs.

21. The computer-implemented method of claim 20, wherein the plurality of data sensitivity parameters includes at least one of:
a cloud resource type of the given cloud resource,
a volume measure of the data in the given cloud resource,
an impact measure of impact of potential breach of the data in the given cloud resource,
a likelihood measure of likelihood of potential breach of the data in the given cloud resource,
data sensitivity entity categories attributed to the data in the given cloud resource, or
data governance categories attributed to the data in the given cloud resource.

22. A system for prioritized presentation of cloud resources susceptible to cloud security risks, the system comprising:
a processor, including memory accessible by the processor, the memory including instructions executable to:
on a cloud resource-by-cloud resource basis, analyze data in a given cloud resource, and attribute to the given cloud resource:
a plurality of data sensitivity parameters to the data in the given cloud resource, and
a given peak value indicating an appraisal of the data in the given cloud resource; and
display a graphical interface including graphical objects configured to display the given cloud resource, the plurality of data sensitivity parameters, and the given peak value; and
wherein the graphical interface is configured to amplify and/or attenuate a display priority of the cloud resources in dependence upon corresponding peak values, and
the memory includes instructions executable to update, in response to user specification, the corresponding peak values by updating corresponding cost functions to generate updated corresponding peak values.

* * * * *